US012650667B2

(12) United States Patent
Zeng et al.

(10) Patent No.: US 12,650,667 B2
(45) Date of Patent: Jun. 9, 2026

(54) DISPLAY APPARATUS HAVING LIQUID CRYSTAL GRATING, METHOD FOR CONTROLLING DISPLAY APPARATUS, AND HOLOGRAPHIC 3D DISPLAY SCREEN

(71) Applicant: Shanghai Tianma Microelectronics Co., Ltd., Shanghai (CN)

(72) Inventors: Yang Zeng, Shanghai (CN); Qijun Yao, Shanghai (CN); Quanpeng Yu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 310 days.

(21) Appl. No.: 18/403,294

(22) Filed: Jan. 3, 2024

(65) Prior Publication Data

US 2024/0134315 A1 Apr. 25, 2024
US 2024/0231274 A9 Jul. 11, 2024

(30) Foreign Application Priority Data

May 30, 2023 (CN) .......................... 202310631070.6

(51) Int. Cl.
| | |
|---|---|
| *G02B 26/10* | (2006.01) |
| *G02B 27/00* | (2006.01) |
| *G02B 30/24* | (2020.01) |
| *G02B 30/54* | (2020.01) |
| *G02F 1/1347* | (2006.01) |

(Continued)

(52) U.S. Cl.
CPC ......... *G03H 1/2205* (2013.01); *G02B 26/101* (2013.01); *H04N 13/383* (2018.05); *G03H 2001/0088* (2013.01)

(58) Field of Classification Search
CPC .......... A61B 5/163; A61B 2017/00216; G02B 26/0833–0866; G02B 26/10–108; G02B 27/0093; G02B 2027/0154; G02B 2027/0159; G02B 27/0161; G02B 2027/0163; G02B 2027/0187; G02B 30/22; G02B 30/26; G02B 30/54; G02F 1/13471; G02F 1/19; G02F 1/292; G03H 1/2205; G03H 2001/0088; G03H 2226/05; G06F 3/013; H04N 13/194; H04N 13/302; H04N 13/366; H04N 13/383

See application file for complete search history.

(56) References Cited

U.S. PATENT DOCUMENTS

2020/0174246 A1* 6/2020 Wakabayashi ....... G03B 21/006

FOREIGN PATENT DOCUMENTS

CN 112887701 6/2021

* cited by examiner

*Primary Examiner* — Ryan S Dunning
(74) *Attorney, Agent, or Firm* — KDW FIRM PLLC

(57) ABSTRACT

Provided are a display apparatus, a method for controlling a display apparatus, and a holographic three-dimensional (3D) display screen. The display apparatus includes a display module and an adjustment module. A deflection device of the display module is configured to make an image move at least in a first direction. An actuation device of the adjust-ment module is configured to move or rotate the display module so that the image moves at least in a second direction. The actuation device is added in the display apparatus. The deflection device is controlled to follow the movement direction of the human eye to make the image move in at least a part of the component directions of the movement direction of the human eye on the plane where the deflection device is disposed.

33 Claims, 9 Drawing Sheets

(51) Int. Cl.

| | | |
|---|---|---|
| *G02F 1/19* | (2019.01) | |
| *G02F 1/29* | (2006.01) | |
| *G03H 1/00* | (2006.01) | |
| *G03H 1/22* | (2006.01) | |
| *H04N 13/302* | (2018.01) | |
| *H04N 13/366* | (2018.01) | |
| *H04N 13/383* | (2018.01) | |

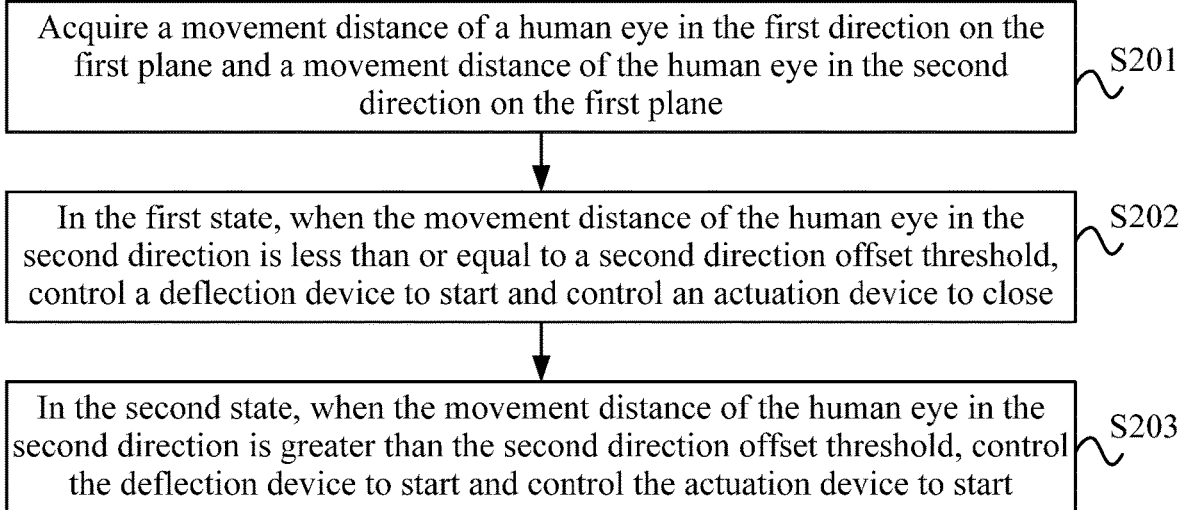

Acquire a movement distance of a human eye in the first direction on the first plane and a movement distance of the human eye in the second direction on the first plane ⟋S201

In the first state, when the movement distance of the human eye in the second direction is less than or equal to a second direction offset threshold, control a deflection device to start and control an actuation device to close ⟋S202

In the second state, when the movement distance of the human eye in the second direction is greater than the second direction offset threshold, control the deflection device to start and control the actuation device to start ⟋S203

FIG. 12

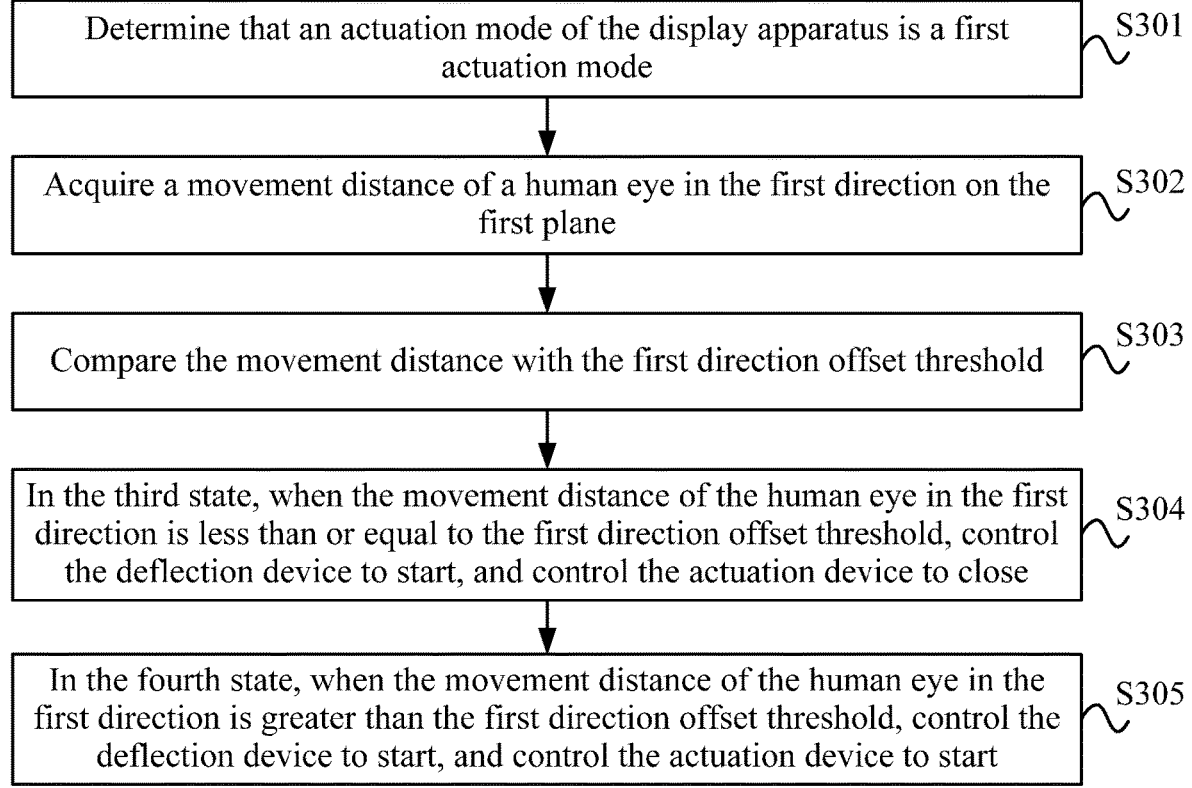

Determine that an actuation mode of the display apparatus is a first actuation mode ⟋S301

Acquire a movement distance of a human eye in the first direction on the first plane ⟋S302

Compare the movement distance with the first direction offset threshold ⟋S303

In the third state, when the movement distance of the human eye in the first direction is less than or equal to the first direction offset threshold, control the deflection device to start, and control the actuation device to close ⟋S304

In the fourth state, when the movement distance of the human eye in the first direction is greater than the first direction offset threshold, control the deflection device to start, and control the actuation device to start ⟋S305

FIG. 13

DISPLAY APPARATUS HAVING LIQUID CRYSTAL GRATING, METHOD FOR CONTROLLING DISPLAY APPARATUS, AND HOLOGRAPHIC 3D DISPLAY SCREEN

CROSS-REFERENCE TO RELATED APPLICATIONS

This application claims priority to Chinese patent application No. 202310631070.6 filed with the China National Intellectual Property Administration (CNIPA) on May 30, 2023, the disclosure of which is incorporated herein by reference in its entirety.

TECHNICAL FIELD

The present disclosure relates to the field of display technologies and, in particular, to a display apparatus, a method for controlling the display apparatus, and a holographic three-dimensional (3D) display screen.

BACKGROUND

The wavefront information of a 3D object can be completely recorded and reconstructed with the holographic display technology, which is one of the promising naked eye 3D display technologies and has been widely concerned by people. How to improve the display effect of a 3D display screen and improve user experience has become an urgent problem to be solved.

SUMMARY

The present disclosure provides a display apparatus, a method for controlling the display apparatus and a holographic 3D display screen. An actuation device is added in the display apparatus so that an image moves at least in one direction. In this manner, the preparation difficulty and cost of a liquid crystal grating in the display apparatus are reduced, the diffraction efficiency of the liquid crystal grating is improved, and the visual display effect of the display apparatus is ensured.

An embodiment of the present disclosure provides a display apparatus. The display apparatus includes a display module and an adjustment module.

The display module includes a deflection device configured to make an image move at least in a first direction.

The adjustment module includes an actuation device. The actuation device is configured to move or rotate the display module to make the image move at least in a second direction.

The first direction is the same as or different from the second direction; the first direction and the second direction each are parallel to a first plane, and the first plane is parallel to a plane where the deflection device is disposed.

An embodiment of the present disclosure further provides a method for controlling a display apparatus. The method is used for controlling the display apparatus provided in the first aspect and includes steps described below.

The deflection device is controlled to make the image move at least in the first direction.

The actuation device is controlled to make the image move at least in the second direction by moving or rotating the display module.

The first direction is the same as or different from the second direction; the first direction and the second direction each are parallel to the first plane, and the first plane is parallel to the plane where the deflection device is disposed.

An embodiment of the present disclosure further provides a holographic 3D display screen including the preceding display apparatus.

BRIEF DESCRIPTION OF DRAWINGS

FIG. 12 is a diagram of another method for controlling a display apparatus according to an embodiment of the present disclosure;

FIG. 13 is a diagram of another method for controlling a display apparatus according to an embodiment of the present disclosure;

DETAILED DESCRIPTION

Figure 1:
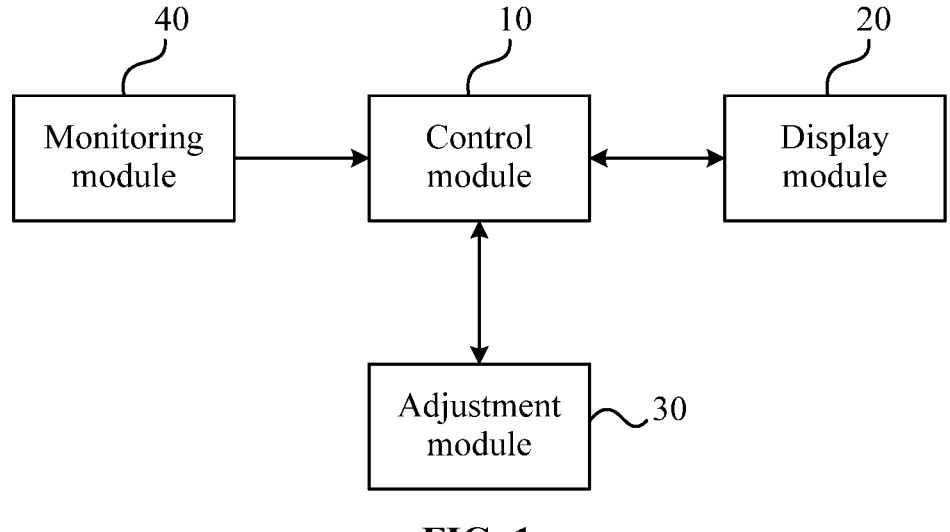
FIG. 1 is a diagram illustrating modules of a display apparatus according to an embodiment of the present disclosure.

Hereinafter the present disclosure is further described in detail in conjunction with the drawings and embodiments. It is to be understood that the embodiments described herein are intended to illustrate and not to limit the present disclosure. Additionally, it is to be noted that for ease of description, only part, not all, of structures related to the present disclosure are illustrated in the drawings.

For the holographic 3D display screen in the related art, in some use scenarios, when the user moves in a wide range, the angle of the deflection by the holographic 3D display screen to the image is difficult to meet the movement range of the user, or when the holographic 3D display screen deflects the image by a large angle, the effect of diffraction of the image by the liquid crystal grating from a large viewing angle decreases, affecting the display effect.

Based on the preceding technical problems, the inventors have further proposed technical schemes of the embodiments of the present disclosure. A display apparatus provided in the embodiments of the present disclosure includes a display module and an adjustment module. The display module includes a deflection device configured to make an image move at least in a first direction. The adjustment module includes an actuation device. The actuation device is configured to move or rotate the display module to make the image move at least in a second direction. The first direction is the same as or different from the second direction. The first direction and the second direction are both parallel to a first plane, and the first plane is parallel to a plane where the deflection device is disposed.

With the preceding technical scheme, the actuation device is added. During the application of the display apparatus, the deflection device is controlled to follow the movement direction of the user to move the image at least along the first direction; the actuation device is controlled to follow the movement direction of the user and move or rotate the display module to make the image move at least along the second direction, and the directions in which the image is moved by the deflection device and the actuation device may be the same or different, thereby solving the problems that the deflection range caused by the deflection device of the display module is limited, that the user cannot observe the image when the user moves in a wide range and that the deflection effect of the image is low when the deflection device of the display module deflects the image at a wide viewing angle.

The preceding is the core idea of the present disclosure. The technical schemes in the embodiments of the present disclosure are described clearly and completely hereinafter in conjunction with the drawings in the embodiments of the present disclosure. Based on the embodiments of the present disclosure, all other embodiments obtained by those of ordinary skill in the art on the premise that no creative work is done are within the scope of the present disclosure.

Figure 2:
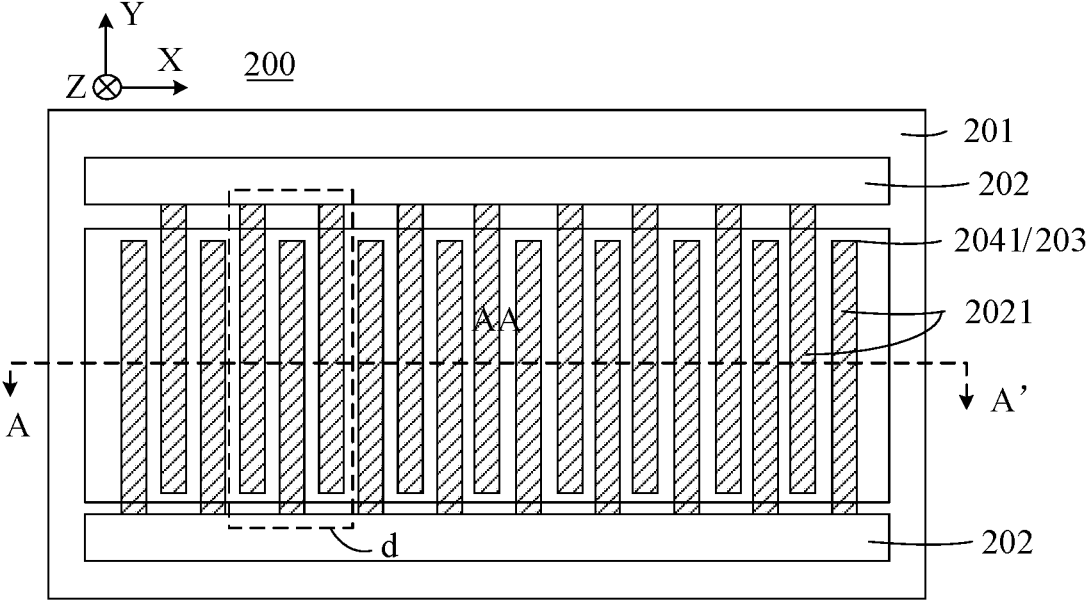
FIG. 2 is a surface view of a display apparatus according to an embodiment of the present disclosure.
Figure 3:
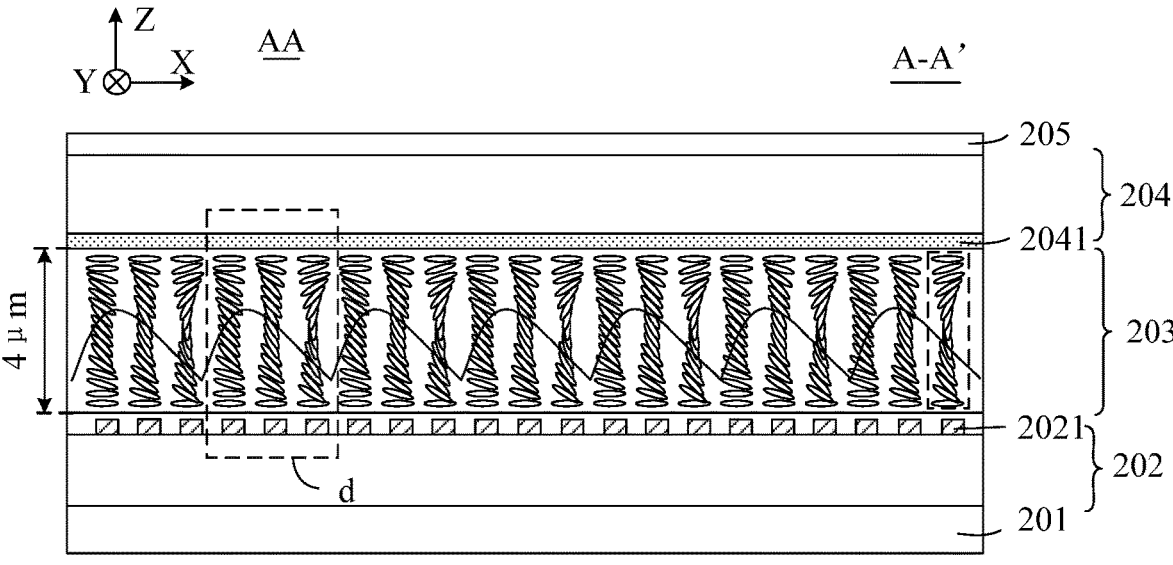
FIG. 3 is a sectional view of the display apparatus of FIG. 2 taken along AA'.
Figure 4:
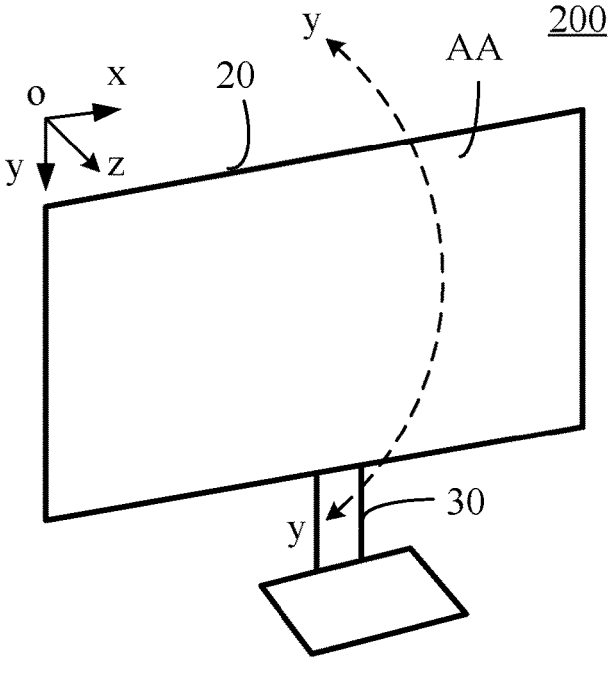
FIG. 4 is a structural view of a display apparatus according to an embodiment of the present disclosure.
Figure 5:
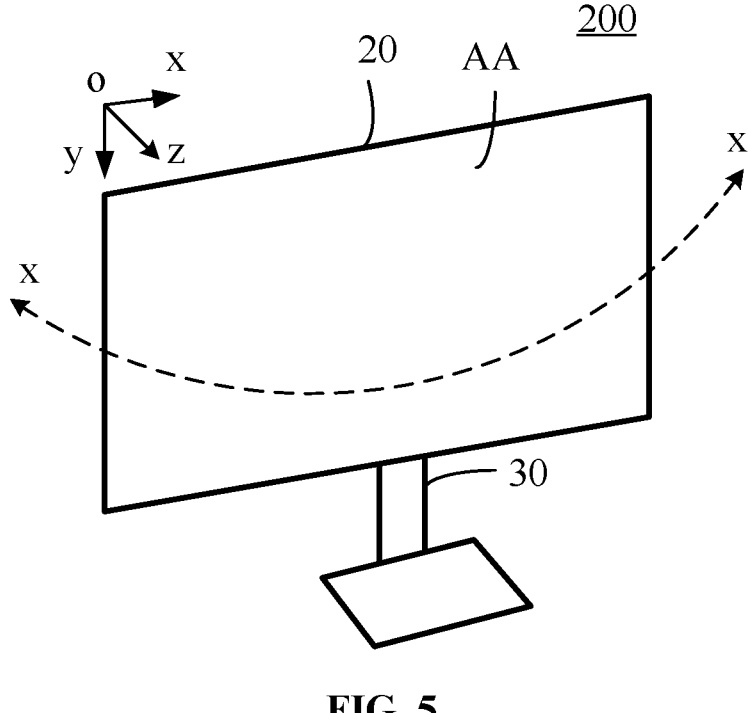
FIG. 5 is a structural view of another display apparatus according to an embodiment of the present disclosure.
Figure 6:
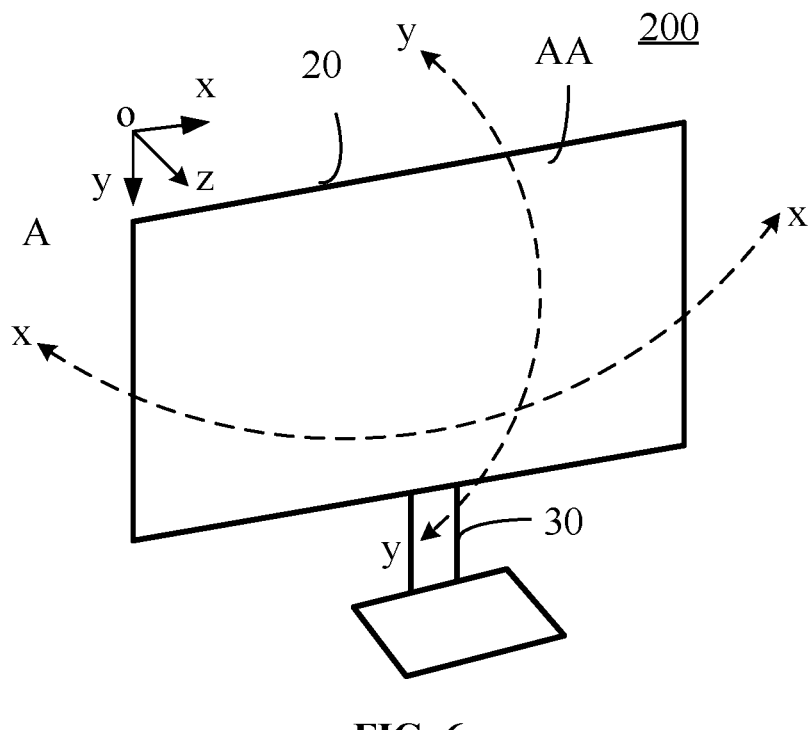
FIG. 6 is a structural view of another display apparatus according to an embodiment of the present disclosure.

FIG. 1 is a diagram illustrating modules of a display apparatus according to an embodiment of the present disclosure. FIG. 2 is a surface view of a display apparatus according to an embodiment of the present disclosure. FIG. 3 is a sectional view of the display apparatus of FIG. 2 taken along AA'. FIG. 4 is a structural view of a display apparatus according to an embodiment of the present disclosure. FIG. 5 is a structural view of another display apparatus according to an embodiment of the present disclosure. FIG. 6 is a structural view of another display apparatus according to an embodiment of the present disclosure.

In an embodiment, as shown in FIG. 1 to FIG. 6, a display apparatus 200 provided in the embodiments of the present disclosure includes a display module 20 and an adjustment module 30. The display module 20 includes a deflection device (not shown in the figure) configured to make an image move at least in a first direction, the adjustment module 30 includes an actuation device (not shown in the figure), and the actuation device is configured to move or rotate the display module 20 to make the image move at least in a second direction. The first direction is the same as or different from the second direction, the first direction and the second direction each are parallel to a first plane, and the first plane is parallel to a plane where the deflection device is disposed.

In an example, with reference to FIG. 1, the display apparatus 200 includes the display module 20 and the adjustment module 30. As shown in FIG. 2 to FIG. 6, the display apparatus 200 includes a display device of a liquid crystal display (LCD), and the display module 20 includes a display area AA from which image light is emitted for displaying an image. It is to be understood that the display apparatus further includes a backlight source (not shown in the figure) for providing backlight to the display module 20.

With reference to FIGS. 2 and 3, in the Z direction, the display area AA includes a base substrate 201, an array substrate 202, a liquid crystal layer 203, and a color film substrate 204, and the array substrate 202, the liquid crystal layer 203, and the color film substrate 204 are sequentially disposed on one side of the base substrate 201. A plurality of pixel electrodes 2021 are included and disposed on the side of the array substrate 202 facing the liquid crystal layer 203. A common electrode 2041 is included on the side of the color film substrate 204 facing the liquid crystal layer 203. The pixel electrodes 2021 are disposed opposite to the common electrode 2041. The common electrode 2041 may be arranged in a whole layer. The materials of the common electrode 2041 and the pixel electrodes 2021 may be transparent conductive materials, such as indium tin oxide (ITO), indium zinc oxide (IZO), and the like, so as to improve the light transmittance of the display apparatus and the brightness, contrast and other parameters of the display apparatus.

The deflection device includes the liquid crystal grating (LCG). The liquid crystal grating is a device that makes use of the phase difference and deflection characteristics change between ordinary light and unusual light caused by periodic changes of optical characteristics such as the refractive index of liquid crystal. The liquid crystal grating may change or keep the propagation direction of incident light and generate left-eye images and right-eye images in users' eyes based on the incident light.

With continued reference to FIGS. 2 and 3, the liquid crystal grating includes the pixel electrodes 2021, the liquid crystal layer 203 and the common electrode 2041. The array substrate 202 further includes driver circuits (not shown in the figure) electrically connected to the pixel electrodes 2021 and the common electrode 2041, for providing drive voltages. Set drive voltages are applied to the pixel electrodes 2021 and the common electrode 2041 so that an electric field is formed between the pixel electrodes 2021 and the common electrode 2041 so as to drive liquid crystal molecules in the liquid crystal layer 203 to rotate, thereby changing the emission direction of the emission light. In this manner, the emission light reaches the left eye and right eye of the user, a left-eye image and a right-eye image are sequentially generated in the user's eyes, and finally a 3D display image is realized.

The number of liquid crystal gratings stacked in the display module 20 affects the ability of the liquid crystal gratings to deflect incident light. In an example, with continued reference to FIG. 4 and FIG. 5, in the case where the number of liquid crystal gratings stacked in the display module 20 is set to be 1, the liquid crystal grating may make the image move in the X direction. With continued reference to FIG. 6, in the case where the number of liquid crystal gratings stacked in the display module 20 is set to be greater than 1, the deflection direction of the stacked liquid crystal gratings to the image is adjusted, and the liquid crystal gratings can make the image move not only in the X direction but also in the Y direction.

Further, with reference to FIG. 4 to FIG. 6, an adjustment module 30 is provided in the display apparatus 200 and includes an actuation device. For example, the actuation device may be a rotator having a mechanical rotation function and is capable of making the display module 20 rotate about the central axis of the display module; and/or the actuation device may be a translation stage having a displacement function and is capable of making the display module 20 move in at least one direction.

In an example, the actuation device and the display module 20 are connected by a universal structure. In an embodiment, the display module 20 and the actuation device are connected by a rigid cardan universal joint, and the included angle between the display module 20 and the actuation device may be adjusted within a certain range. The actuation device controls the display module 20 to mechanically rotate in at least the second direction along the movement direction of the user so that the image is deflected to the left and right eyes of the user.

In the application of the display apparatus, since the movement range of the user is wide, the ability of the deflection device to deflect the incident light is limited, and the image cannot be deflected to the eyes of the user; alternatively, even if the image can be deflected to the eyes of the user, the diffraction efficiency of the image is poor because the deflection angle of the incident light caused by the deflection device is large. At this time, the display apparatus 200 activates the actuation device. The actuation device is controlled to mechanically move or rotate the display module 20 in at least the second direction along the movement direction of the user, so that the image emitted from the display area AA moves along the component direction of the movement direction of the human eyes presented on the plane in which the deflection device is disposed. The actuation device may assist the deflection device in deflecting the image to the eyes of the user, so as to compensate for the large viewing angle of deflection that the deflection device cannot achieve for the image, and ensure the diffraction efficiency of the image deflected by the deflection device at the large viewing angle, thereby improving the display effect.

In some embodiments, with continued reference to FIG. 4, on the XOY plane, the first direction is the X direction, the second direction is the Y direction, and the XOY plane is parallel to the plane in which the deflection device is located. Along the movement direction of the user on the XOY plane, the deflection device may make the image move in the X direction, and the actuation device may make the image move in the Y direction by moving or rotating the display module 20. The actuation device compensates for the deflection direction which the deflection device cannot reach in the Y direction.

In some embodiments, with continued reference to FIG. 5, the first and second directions on the XOY plane each are the X direction. Along the movement direction of the user on the XOY plane, the deflection device deflects the image in the X direction, and the actuation device makes the image move in the X direction. The direction in which the actuation device makes the image move is the same as the direction in which the deflection device deflects the image. The actuation device can compensate for, in the same direction, a deflection distance or a deflection angle that the deflection device cannot reach.

In some embodiments, with continued reference to FIG. 6, on the XOY plane, the first direction is the X direction, the second direction is the Y direction, and the XOY plane is parallel to the plane in which the deflection device is located. The deflection device may make the image move in the X direction and in the Y direction. The actuation device may make the image move in the X direction and/or in the Y direction by moving or rotating the display module 20. The actuation device makes the image move in the X direction and/or in the Y direction to compensate for, in at least one direction, a deflection distance or a deflection angle that the deflection device cannot reach.

It is to be understood that the position and structure of the adjustment module 30 in FIG. 4 to FIG. 6 are merely one example. In other embodiments, the adjustment module 30 may be a device incorporated in or on the back surface of the display module 20 and cannot be shown in a structural form in the figures, which is to be understood by those skilled in the art. The structural form is not exemplified one by one in the present application.

It is to be noted that the eyes of the user may also move in the direction vertical to the plane where the deflection device is located, such as in the Z direction in FIG. 4 to FIG. 6. The movement component in the Z direction is not considered in the embodiments of the present application. Therefore, in all embodiments provided herein, movement in a direction parallel to the plane where the deflection device is disposed refers to the orthographic projection of the trajectory of the movement of the human eye presented on the plane, which is not explained one by one in other embodiments.

With continued reference to FIG. 3, the display apparatus 200 provided in the embodiment of the present application further includes other film layers such as a glass cover plate 205, a polarizing layer (not shown in the figure), and the like, which act together to implement the display function of the display apparatus. Such film layers are not described herein one by one.

In view of the above, the actuation device is added in the display apparatus provided in the embodiments of the present disclosure. The deflection device is controlled to follow the movement direction of the human eyes to make the image move in at least a part of the component directions of the movement direction of the human eyes on the plane where the deflection device is disposed. At the same time, the actuation device is controlled to move or rotate the display module to make the image move, in the same direction or different directions, in at least a part of the component directions of the movement direction of the human eyes on the plane where the deflection device is disposed. When the user moves in a wide range, the deflection range of the deflection device is compensated for by the actuation device and the diffraction effect of the deflection device when the image is deflected at a wide viewing angle is ensured, thereby improving the display effect.

In one possible implementation, the first direction is different from the second direction. The actuation device and the deflection device make the image move in different directions which are both parallel to a component of the movement direction of the human eyes presented on the first plane.

In an example, with continued reference to FIG. 4, the direction (first direction) in which the deflection device deflects incident light (an image) on the XOY plane is the X direction, and the direction (second direction) in which the actuation device makes the image move on the XOY plane is the Y direction. The XOY plane is parallel to the plane where the deflection device is located. In an actual application scenario, the X direction and the Y direction each are parallel to at least a part of the component directions of the movement direction of the human eye on the XOY plane.

The deflection device adopts a liquid crystal grating (LCG). The X direction is parallel to the horizontal component of the movement direction of the human eye. The Y direction is parallel to the vertical component of the movement direction of the human eye. When the user moves simultaneously in the horizontal and vertical directions, the liquid crystal grating deflects the image to follow the user to move in the horizontal direction, and the actuation device follows the user to move or rotate the display module 20 in the Y direction to make the image move in the vertical direction, thereby moving the image in the Y direction that the liquid crystal grating cannot reach, so that the image can be observed by the human eyes.

In the present application, the image is deflected horizontally by the liquid crystal grating and deflected vertically through the actuation device. By adopting the structure design of mechanically moving or rotating the display module, a liquid crystal grating with multi-direction and a large deflection angle does not need to be prepared, so that the preparation process difficulty of the liquid crystal grating can be reduced, the number of liquid crystal gratings can be saved, and the power consumption of the display apparatus can be reduced.

On the basis of the preceding embodiments, the display apparatus includes a second direction offset threshold. The second direction offset threshold is a starting condition of the actuation device and is a critical value at which the display apparatus starts the actuation device to make the image move in the second direction according to the movement distance of the human eye in the second direction. Exemplarily, according to the movement range of the human eye in the vertical direction, in an example, the value range of the second direction offset threshold may be between 0 mm and 50 mm. For example, the second direction offset threshold is set to 2 mm, 50 mm or the like.

With continued reference to FIG. 4, the starting and closing states of the deflection device and the actuation device are related to the magnitudes of the second direction offset threshold, and the movement distance of the human eyes in the Y direction when the movement direction of the human eyes is projected on the XOY plane.

In a first state, when a movement distance of a human eye in the second direction is less than or equal to the second direction offset threshold, the deflection device is started and the actuation device is closed.

Exemplarily, when the movement distance of the human eye in the Y direction when the movement direction of the human eye is projected on the XOY plane is less than or equal to the second direction offset threshold, it represents that the movement distance of the human eye in the Y direction when the movement direction of the human eye is projected on the XOY plane is relatively small, and the display apparatus 200 merely needs to start the deflection device to deflect the image, which is enough to deflect the image into the eyes of the user. The actuation device is closed, and the power consumption of the display apparatus can be reduced.

In a second state, when a movement distance of a human eye in the second direction is greater than the second direction offset threshold, the deflection device is started and the actuation device is started.

Exemplarily, in a case where the movement distance of the human eye in the Y direction when the movement direction of the human eye is projected on the XOY plane is greater than the second direction offset threshold, the deflection device and the actuation device need to be simultaneously started. The image is deflected in the X direction by the deflection device and is moved in the Y direction through the actuation device. The actuation device compensates for making the image move in the Y direction that the deflection device cannot reach so that the image can be observed by the user.

On the basis of the preceding embodiments, the second direction offset threshold includes a second sensitive threshold which is the minimum resolution distance of the human eye in the second direction on the first plane for the image.

With continued reference to FIG. 4, the second sensitive threshold may also be understood as follows: the movement direction of the human eyes is projected on the XOY plane, when the human eyes move from one position to another position in the Y direction, the image sensed by the human eyes does not change, and the distance between these two positions is the minimum resolution distance of the eyes for the image; and when the human eyes move beyond the distance, the image perceived by the human eyes changes.

In the second state, when the display apparatus detects that the movement distance of the human eye in the Y direction is greater than the second sensitive threshold, the deflection device is started, and the actuation device is started. The second sensitive threshold is taken as a condition for starting the actuation device. Therefore, the sensitivity of starting the actuation device in the second direction can be improved, the frequent starting of the actuation device can be avoided, and thus the power consumption of the actuation device can be reduced.

In a possible implementation, with continued reference to FIG. 5 and FIG. 6, the first direction is the same as the second direction. The actuation device and the deflection device make the image move in the same direction which is parallel to a component of the movement direction of the human eye presented on the first plane.

In an example, with continued reference to FIG. 5 and FIG. 6, the direction (first direction) in which the deflection device deflects incident light (an image) on the XOY plane and the direction (second direction) in which the actuation device makes the image move on the XOY plane each are the X direction in the figures. The XOY plane is parallel to the plane where the deflection device is disposed. In the actual application scenario of the display apparatus 200, the X direction is parallel to the horizontal component of the movement direction of the human eye on the XOY plane.

The deflection device adopts a liquid crystal grating (LCG). The deflection device and the actuation device make the image follow the user to move in the horizontal component direction. When the user moves in a wide range in the horizontal component direction, the liquid crystal grating cannot deflect the image to the human eye in the horizontal component direction. In this case, the actuation device is started, and the actuation device moves or rotates the display module 20 to make the image move in the horizontal component direction to compensate for the movement distance that the liquid crystal grating cannot reach, so that the image is clearly observed by the human eye. Alternatively, when the liquid crystal grating deflects the image at a large viewing angle, the diffraction effect of the image is too low. In this case, the actuation device is started and is used to make the image move in the horizontal component direction, and then the image is deflected to the human eye by the liquid crystal grating, thereby improving the diffraction efficiency of the liquid crystal grating when the image is deflected at a large viewing angle and improving the display effect.

It should be noted that when the image moves, the movement direction of the image is not strictly vertical or horizontal, and the image may move in a diagonal direction. At this time, the movement distance in the vertical direction and the movement distance in the horizontal direction are the movement distance in the vertical component direction and the movement distance in the horizontal component direction, respectively.

In an example, with continued reference to FIG. 6, the first direction and the second direction may each be the Y direction in the figure. In the actual application scenario of the display apparatus 200, the Y direction is parallel to the vertical component of the movement direction of the human eye on the XOY plane. The deflection device and the actuation device may make the image move in the vertical component of the movement direction of the user.

On the basis of the preceding embodiments, the maximum movement distance by which the actuation device makes the image move in the first direction is greater than the maximum movement distance by which the deflection device makes the image move in the first direction.

In an example, with continued reference to FIG. 5, the first direction and the second direction each are the X direction, the deflection device and the actuation device may make the image move in the X direction on the XOY plane, and the maximum movement distance by which the actuation device makes the image move in the X direction is set to be greater than the maximum movement distance by which the deflection device makes the image move in the X direction.

In an example, with continued reference to FIG. 6, the deflection device and the actuation device may make the image move in at least two directions on the XOY plane. The first direction and the second direction each are the X direction. The deflection device and the actuation device may make the image move in the X direction on the XOY plane, and the maximum movement distance by which the actuation device makes the image move in the X direction is set to be greater than the maximum movement distance by which the deflection device makes the image move in the X direction. Alternatively, the deflection device and the actuation device may make the image move in the Y direction on the XOY plane, and the maximum movement distance by which the actuation device makes the image move in the Y direction is set to be greater than the maximum movement distance by which the deflection device makes the image move in the Y direction.

In view of the above, in the same movement direction, the maximum movement distance by which the actuation device makes the image move is greater than the maximum movement distance by which the deflection device makes the image move. Through this limitation to the movement distance, the number of stacked deflection devices can be reduced as much as possible, and the power consumption and cost of the display apparatus are reduced. At the same time, when the human eyes move in a wide range, the actuation device is fully used to move the image, reducing the angle by which the deflection device deflects the image, improving the diffraction efficiency when the deflection device deflects the image at a large angle, and improving the display effect at a large viewing angle.

On the basis of the preceding embodiments, with continued reference to FIG. 5 and FIG. 6, when the actuation device is configured to compensate in the direction which is the same as the direction in which the image is moved by the deflection device, the display apparatus includes a first actuation mode and a first direction offset threshold.

The first direction offset threshold is a starting condition of the actuation device and is a critical value at which the display apparatus starts the actuation device to make the image move in the first direction according to the movement distance of the human eye in the first direction. Exemplarily, according to the movement range of the human eye in the horizontal direction, in an example, the value range of the first direction offset threshold may be between 0 mm and 100 mm. For example, the first direction offset threshold is set to 2 mm, 100 mm or the like.

The actuation mode of the display apparatus may be set in advance. In the first actuation mode, the display apparatus controls the deflection device and the actuation device to start so as to make the image move to the human eyes according to the movement distance of the human eyes in the first direction and the magnitude of the first direction offset threshold. The first actuation mode includes a third state and a fourth state.

In the third state, when the movement distance of the human eye in the first direction is less than or equal to the first direction offset threshold, the deflection device is started and the actuation device is closed.

Exemplarily, with continued reference to FIG. 5, in the case where the movement distance of the human eye in the X direction when the movement direction of the human eye is projected on the XOY plane is less than or equal to the first direction offset threshold, it represents that the movement distance of the human eye in the X direction when the movement direction of the human eye is projected on the XOY plane is relatively small, and the display apparatus 200 merely needs to start the deflection device to deflect the image, which is enough to meet the movement range of the human eye. The actuation device is closed, and the power consumption of the display apparatus can be reduced.

In the fourth state, when the movement distance of the human eye in the first direction is greater than the first direction offset threshold, the deflection device is started and the actuation device is started.

Exemplarily, with continued reference to FIG. 5, in the case where the movement distance of the human eye in the X direction when the movement direction of the human eye is projected on the XOY plane is greater than the first direction offset threshold, the deflection device and the actuation device need to be simultaneously started. The deflection device is started to deflect the image in the X direction, and the actuation device is started at the same time to assist the deflection device in jointly moving the image along the X direction to the human eyes. The actuation device is used to compensate for the diffraction effect when the deflection device deflects the image at a large viewing angle. Additionally, the number of deflection devices stacked and the difficulty of the preparation process can be reduced when the deflection device is designed, thereby reducing the power consumption of the deflection device.

On the basis of the preceding embodiments, the first direction offset threshold includes a first sensitive threshold which is the minimum resolution distance of the human eyes in the first direction on the first plane for the image.

Exemplarily, with continued reference to FIG. 5, the first sensitive threshold may also be understood as follows: the movement direction of the human eyes is projected on the XOY plane, when the human eyes move from one position to another position in the X direction, the image sensed by the human eyes does not change, and the distance between these two positions is the minimum resolution distance of the eyes for the image.

In the fourth state, in the case where the display apparatus detects that the movement distance of the human eye in the X direction is greater than the first sensitive threshold, the deflection device is started, and the actuation device is started. The first sensitive threshold is taken as a condition for starting the actuation device. Therefore, the sensitivity of starting the actuation device in the first direction can be improved, the frequent starting of the actuation device can be avoided, and thus the power consumption of the actuation device can be reduced.

On the basis of the preceding embodiments, the first direction offset threshold includes a horizontal direction threshold and a vertical direction threshold, and the horizontal direction threshold is less than the vertical direction threshold.

Exemplarily, with continued reference to FIG. 6, the movement direction of the human eye is projected on the XOY plane, the X direction is parallel to the horizontal component of the movement direction of the human eyes, and the Y direction is parallel to the vertical component of the movement direction of the human eyes. The actuation device and the deflection device act together to make the image movable not only in the X direction but also in the Y direction.

The horizontal direction threshold is a starting condition for the actuation device to make the image move in the horizontal direction and is the critical value at which the display apparatus starts the actuation device to make the image move along the horizontal component direction according to the movement distance of the human eyes in the horizontal component direction. The vertical direction threshold is a starting condition for the actuation device to make the image move in the vertical direction and is the critical value at which the display apparatus starts the actuation device to make the image move along the vertical component direction according to the movement distance of the human eyes in the vertical component direction.

Generally, the movement range of the human eye in the horizontal direction is wider than the movement range of the human eye in the vertical direction. The horizontal direction threshold of the movement in the horizontal direction for the actuation device is set to be less than the vertical direction threshold of the movement in the vertical direction for the actuation device, so that it is possible to control the critical value at which the actuation device makes the image move in the horizontal direction to be less than the critical value at which the actuation device makes the image move in the vertical direction. The smaller the critical value, the more accurate the starting condition of the actuation device, thereby improving the sensitivity of the actuation device in the horizontal direction to meet the frequent and wide-range movement application of the user in the horizontal direction.

In an example, in the fourth state provided in the preceding embodiments, when the movement distance of the human eye in the X direction is greater than the horizontal direction threshold, the actuation device is started to assist the deflection device in moving the image in the X direction. When the movement distance of the human eye in the Y direction is greater than the vertical direction threshold, the actuation device is started to assist the deflection device in moving the image in the Y direction. The actuation device may assist the deflection device in moving the image in both the X direction and the Y direction to finally deflect the image to the eyes of the user.

On the basis of the preceding embodiments, it is considered that the movement range of the human eye in the horizontal direction is wider than the movement range of the human eye in the vertical direction, so it may be further provided that the maximum movement distance by which the actuation device makes the image move in the horizontal component direction is greater than the maximum movement distance by which the actuation device makes the image move in the vertical component direction so as to meet the wide movement range of the human eye in the horizontal direction.

Figure 7:
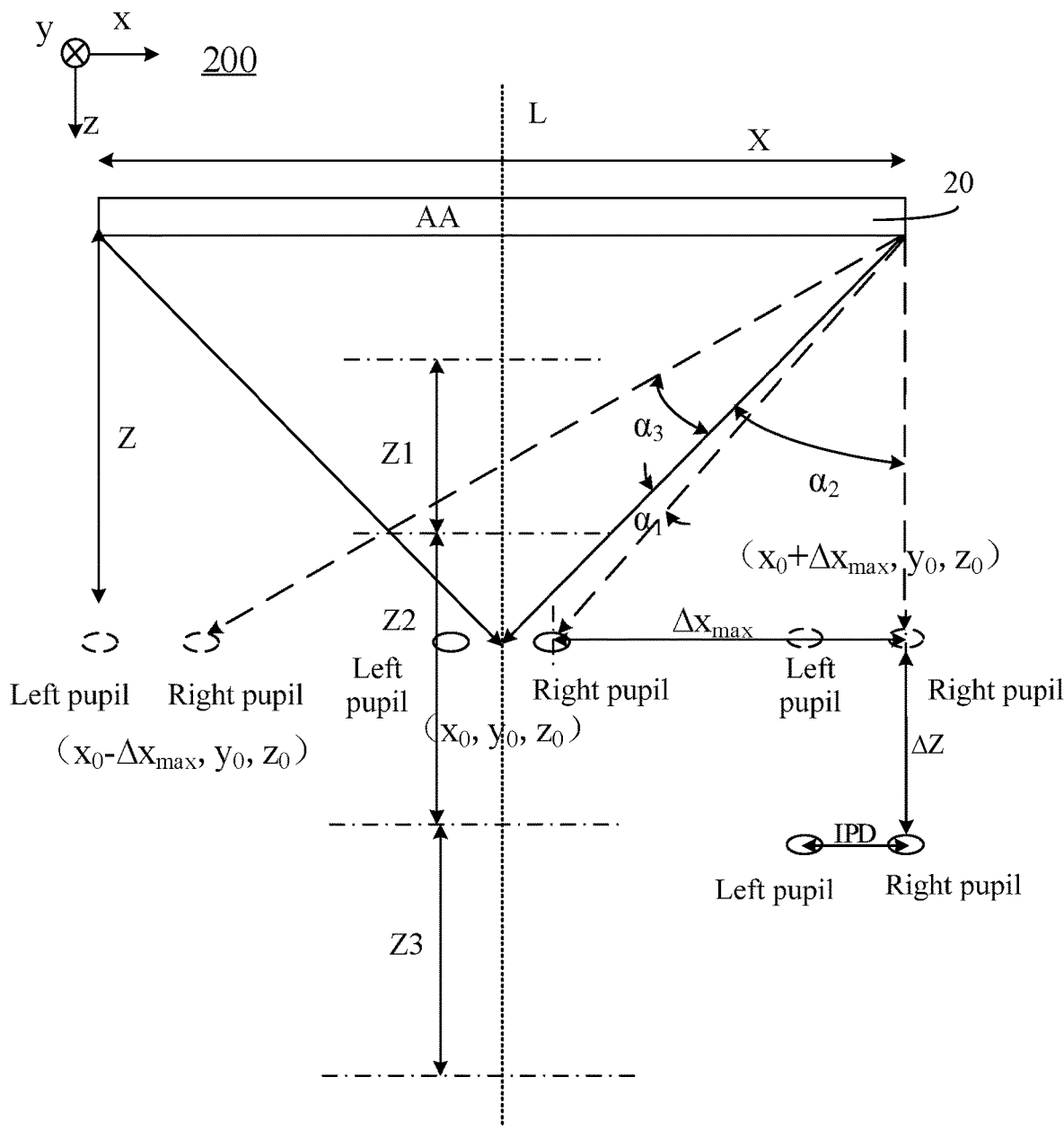
FIG. 7 is a diagram illustrating that the display apparatus provided in FIG. 6 moves an image in a first direction.
Figure 8:
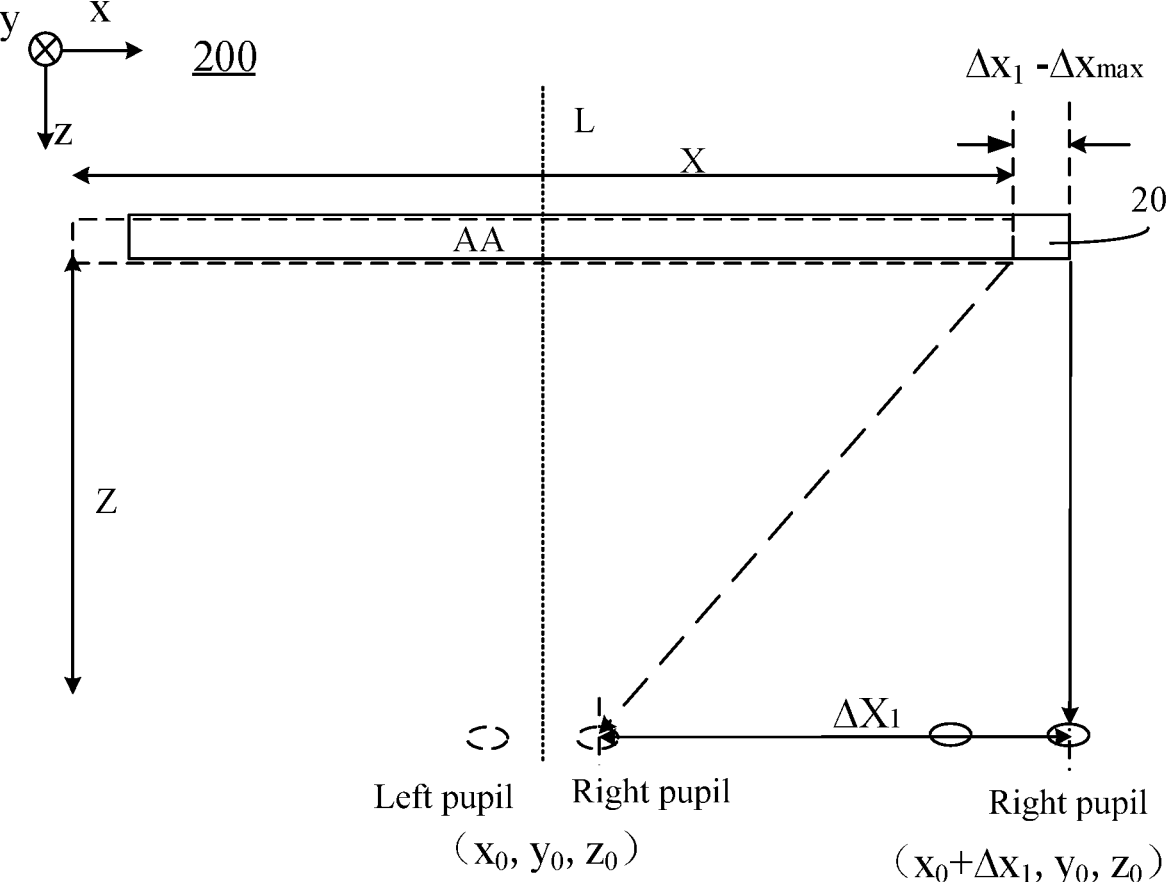
FIG. 8 is a diagram illustrating that the display apparatus provided in FIG. 6 moves an image in a first direction.

FIG. 7 is a diagram illustrating that the display apparatus provided in FIG. 6 moves an image in the first direction. FIG. 8 is a diagram illustrating that the display apparatus provided in FIG. 6 moves an image in the first direction.

On the basis of the preceding embodiments, the first direction offset threshold includes a first maximum deflection distance which is the maximum movement distance by which the deflection device deflects the image from a front viewing angle of the human eye relative to the first plane along the first direction to the maximum squint angle.

With reference to FIG. 7, the first direction is the X direction as an example. The front viewing angle of the human eye relative to the first plane refers to that the human eyes face the center of the plane where the deflection device is disposed. The initial position of the human eyes relative to the XOY plane is $(x_0, y_0, z_0)$. The human eyes move relative to the XOY plane in the X direction, and the position having the maximum squint angle is $(x_0+\Delta x_{max}, y_0, z_0)$. The deflection device deflects the image along the X direction from the initial position of the human eyes relative to the XOY plane to the position having the maximum squint angle and such movement distance is the maximum movement distance $\Delta x_{max}$.

In an example, with reference to FIG. 8, in the fourth state provided in the preceding embodiments, when the human eyes move in the X direction from the initial position $(x_0, y_0, z_0)$ relative to the XOY plane to a squint angle position $(x_0+\Delta x_1, y_0, z_0)$, where $\Delta x_1 > \Delta x_{max}$, the movement distance $\Delta x_1$ of the human eyes in the X direction at this time has exceeded the maximum movement distance $\Delta x_{max}$ by which the deflection device can deflect the image. In this case, the image cannot be normally acquired by the user merely through the starting of the deflection device, and the actuation device needs to be started at the same time to assist the deflection device in deflecting the image.

In a possible implementation, with continued reference to FIG. 8, the actuation device is controlled to move the display area AA of the display module in the X direction so that the image is moved by at least the distance of $(\Delta x_1-\Delta x_{max})$ in the X direction. In this case, the deflection device deflects the image to the human eyes.

It is to be noted that the first direction may also be the Y direction in FIG. 8. The deflection to the image by the deflection device in the Y direction and the movement of the image through the actuation device in the Y direction have the same technical effect as the description in the X direction in the preceding embodiment, and no detailed examples are provided herein.

Figure 9:
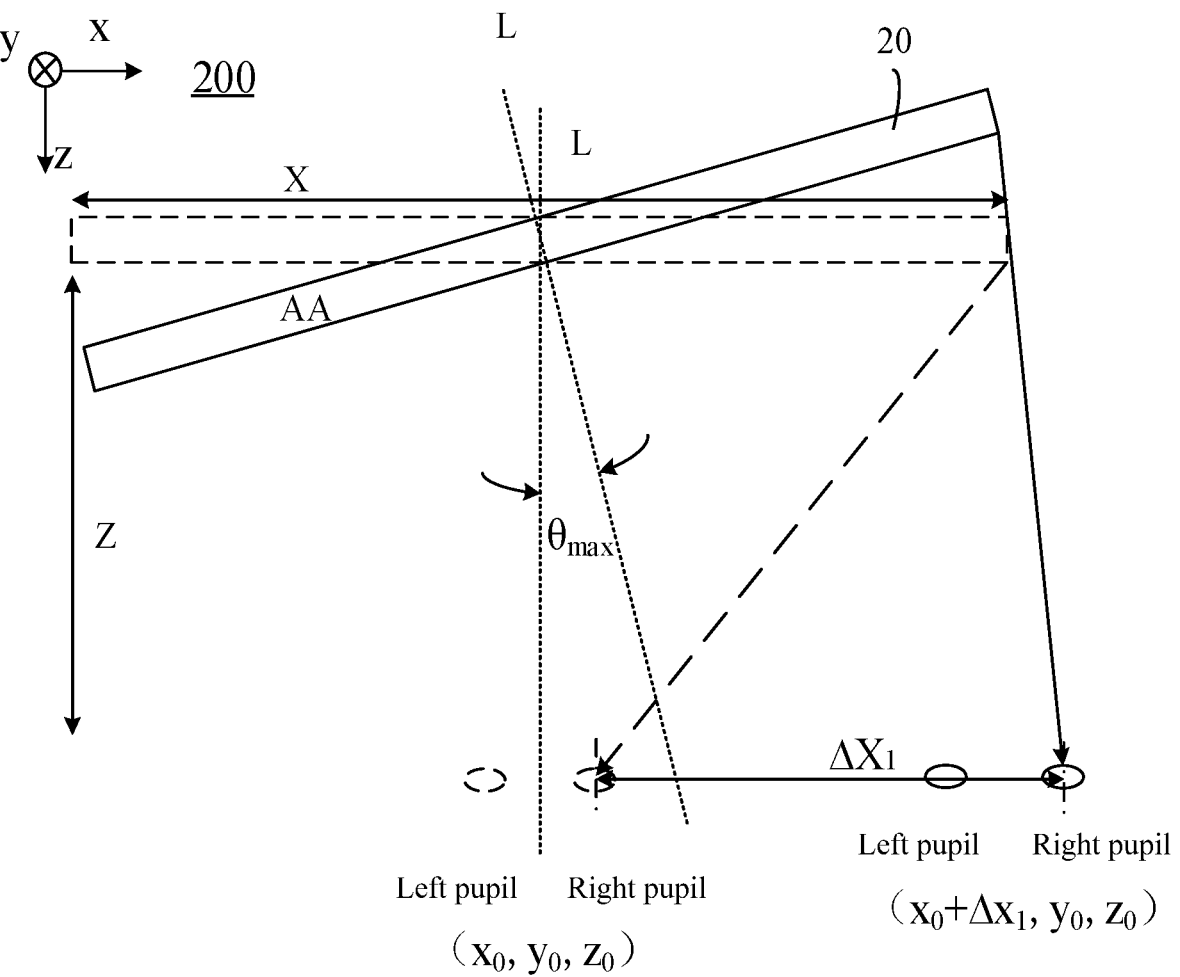
FIG. 9 is a diagram illustrating that the display apparatus provided in FIG. 6 moves an image in a first direction.

FIG. 9 is a diagram illustrating that the display apparatus provided in FIG. 6 moves an image in the first direction.

On the basis of the preceding embodiments, with reference to FIG. 7 and FIG. 9, the human eyes include a left pupil and a right pupil. The initial deflection angle by which the deflection device deflects the image to the right pupil at the front viewing angle of the human eye relative to the first plane is $\alpha_1$. The maximum deflection angle by which the deflection device deflects the image in the first direction to the right pupil at the position having the maximum squint angle is $\alpha_2$. The rotation angle of the actuation device is $\theta_{max}$. $\theta_{max} > (\alpha_2-\alpha_1)$.

With reference to FIG. 9, the rotation angle $\theta_{max}$ refers to an angle range in which the actuation device rotates the display module about the central axis L of the display module. The central axis L refers to a central axis perpendicular to the plane in which the display module is disposed.

With continued reference to FIG. 7, the first direction and the second direction each being the X direction is used as an example. The initial deflection angle $\alpha_1$ is the included angle between the right pupil and the center point of the left pupil and the right pupil under the front viewing angle of the human eyes relative to the XOY plane along the X direction when the deflection device deflects the image. The maximum deflection angle $\alpha_2$ is the included angle between the center point of the left pupil and the right pupil under the front viewing angle of the human eye relative to the XOY plane and the position having the maximum squint angle when the deflection device deflects the image along the X direction.

An embodiment is listed below. With reference to FIG. 7 and Table 1, the display area AA of the display module 20 may also be rotated through the actuation device so that the deflection device deflects the image in the first direction x to the human eyes. It is to be noted that the display module typically is central symmetric with respect to the central axis L. In other embodiments, when the movement component of the movement direction of the human eye in FIG. 7 is the negative direction along the X direction, that is, when the human eyes move towards the left, the deflection device deflects the image along the X direction to the right pupil having the same deflection characteristics as the left pupil. The embodiment of the present application merely provides an example for illustration in which the human eyes move towards the right and the deflection device deflects the image along the X direction to the left pupil.

In FIG. 7 and Table 1, the initial position coordinates $(x_0, y_0, z_0)$ from the front viewing angle of the human eye relative to the XOY plane are set to $(700, 0, 0)$, the amount of movement in the Z direction is $\pm 100$ mm, the amount of movement in the X direction is $\pm 100$ mm, and the amount of movement in the Y direction is $\pm 500$ mm.

TABLE 1

| Position Relationship between Human Eyes and Display Apparatus | | | |
| --- | --- | --- | --- |
| | z/mm | x/mm | y/mm |
| Initial position coordinate | 700 | 0 | 0 |
| Amount of movement± | 100 | 100 | 500 |
| IPD | 65 | / | / |
| AAx | 405 | / | / |
| AAy | 255 | / | / |

Interpupillary distance (IPD) refers to the distance between the pupils of eyes. AAx refers to the length of the display area AA of the display apparatus 200 in the X direction, AAy refers to the length of the display area AA of the display apparatus 200 in the Y direction, and the size of the display area AA is by way of example 19 inches. In Table 1, the unit is the millimeter (mm).

TABLE 2

| Deflection Angle of Deflection Device in First Direction | |
| --- | --- |
| | LCG total deflection angle requirements |
| Initial angle (from VG) | — |
| Deflection angle $\alpha_1$ when the right pupil is at the initial position | 2.48° |
| Deflection angle $\alpha_2$ when the right pupil is at the rightmost position | 10.42° |
| Deflection angle $\alpha_3$ when the right pupil is at the leftmost position | −4.96° |

With reference to the desktop display shown in FIG. 6 and in conjunction with FIG. 7, Table 1 and Table 2, when the user moves, the X direction is parallel to the horizontal component direction of the movement direction of the user in the XOY plane. When the user faces the screen, according to the amount of movement of the human eyes in the X direction, the deflection angle $\alpha_1$ at which the liquid crystal grating (LCG) switches back and forth between the human eyes is about 2.48° obtained through the geometric relation calculation. That is, the initial deflection angle $\alpha_1$ for the right pupil from the front viewing angle with the initial position $(x_0, y_0, z_0)$ when the deflection device deflects the image along the X direction is 2.48°. Further, in the positive direction along the X direction, the deflection angle $\alpha_2$ at the position $(x_0+\Delta x_{max}, y_0, z_0)$ having the maximum squint angle when the right pupil is at the rightmost position is 10.42°. In the negative direction along the X direction, the deflection angle $\alpha_3$ when the right pupil is at the leftmost position is −4.96°.

With reference to FIG. 7 and FIG. 9, when the amount of movement in the horizontal component direction of the user on the XOY plane exceeds the maximum movement distance $\Delta x_{max}$ between the initial position of the image and the position having the maximum squint angle to which the image is deflected by the deflection device in the X direction, such position is the critical position in the positive direction along the X direction and the maximum deflection angle 10.42° in the positive direction along the X direction of the deflection device has reached. If merely the deflection device is used to deflect the image, deflection requirements for the deflection device are high, the deflection device is difficult to design, and at the same time, the diffraction efficiency in the large viewing angle is reduced. If the user continues to move in the positive direction along the X direction and moves beyond the deflection angle caused by the deflection device, the actuation device may be started, and the value of the rotation angle $\theta_{max}$ by which the actuation device mechanically rotates the display area AA of the display module 20 with the central axis L of the display module as the rotation axis is set to be at least greater than the included angle between the human eyes at the position having the front viewing angle and the human eyes at the position having the maximum squint angle, for example, $\theta_{max} \geq \alpha_2 - \alpha_1$, where $\alpha_2 - \alpha_1 = 10.42° - 2.48° = 7.94°$. When the rotation angle $\theta_{max}$ of the actuation device is equal to or greater than 7.94°, the actuation device may drive the display module 20 to rotate in the direction in which the human eyes move, so that the rotation angle caused by the actuation device compensates for the deflection angle of the deflection device in the positive direction along the X direction.

In an example, when the maximum movement distance $\Delta x_{max}$ is beyond the movement range of the user, the actuation device drives the display module 20 to rotate by an angle in the angle range of zero to 7.94°; and when the maximum movement distance $\Delta x_{max}$ is within the movement range of the user, the actuation device drives the display module 20 to rotate by an angle greater than 7.94°, so that the center of the eyes of the user can always face the screen center of the display apparatus. In this case, the liquid crystal grating (LCG) merely needs to switch between the pupils of the human eyes. The rotation angle by which the actuation device drives the display module 20 is set so that it is advantageous for the liquid crystal grating (LCG) to continuously work in the vicinity of the minimum deflection angle (binocular switching), relatively high diffraction efficiency can be implemented, thereby ensuring the display effect of the display apparatus.

In an example, the first direction offset threshold may be set to 2 mm, the actuation device is started only when the movement distance of the human eyes in the X direction is beyond such range, and the deflection angle $\alpha_x$ corresponding to the movement distance of the human eyes in the X direction is calculated. The display area is turned to the human eyes after the mechanical rotation by $\alpha_x$ in the movement direction of the human eyes with the central axis L of the display area AA of the display module as the rotation axis, thereby avoiding frequent rotation of the actuation device and improving the user experience of the display apparatus.

On the basis of the preceding embodiments, the maximum rotation angle includes a horizontal rotation angle and a vertical rotation angle. The horizontal rotation angle refers to an angle range in which the actuation device rotates the display module in the horizontal direction with the central axis L of the display module as the rotation axis. The vertical rotation angle refers to an angle range in which the actuation device rotates the display module in the vertical direction with the central axis L of the display module as the rotation axis.

On the basis of the preceding embodiments, it is considered that the movement range of the human eyes in the horizontal direction is wider than the movement range of the human eyes in the vertical direction, so the horizontal rotation angle may be further set to be greater than the vertical rotation angle so as to meet a relatively wide movement range of the human eyes in the horizontal direction.

On the basis of the preceding embodiments, the display module includes a first light emission wavelength $\lambda_B$, a second light emission wavelength $\lambda_G$, and a third light emission wavelength $\lambda_R$. The second light emission wavelength $\lambda_G$ is greater than the first light emission wavelength $\lambda_B$, and the third light emission wavelength $\lambda_R$ is greater than the second light emission wavelength $\lambda_G$. The maximum angle by which the deflection device deflects the first light emission wavelength $\lambda_B$ is $\alpha_3$. The rotation angle $\theta_{max}$ of the actuation device is set as follows: $\theta_{max} \geq \alpha_2 - \alpha_3$.

TABLE 3

| Current Deflection Angle of Deflection Device | | | |
|---|---|---|---|
| LCG pitch | 4 um | Maximum deflection angle of LCG | |
| The minimum number of gratings ($\geq 2$) | 3 | Single LCG | $0° + 45° \times 2$ |
| $\lambda_R$ | 0.638 um | 3.05° | 7.36° |
| $\lambda_G$ | 0.532 um | 2.54° | 6.13° |
| $\lambda_B$ | 0.442 um | 2.11° | 5.10° |

With reference to FIG. 3 and Table 3, the ability of the LCG to deflect the image refers to the maximum deflection angle of the LCG in the X direction. The maximum angle by which a single LCG deflects the light meets the following formula:

Maximum Deflection Angle of Single $$LCG = \arcsin\left(\frac{\lambda}{LCG \ \text{Pitch} \times \text{Minimum number of gratings}}\right), \quad (1.1)$$

With reference to FIG. 3, the LCG pitch refers to the pixel pitch of the LCG and refers to the thickness of the liquid crystal layer 203 of FIG. 3 in the Z direction. Exemplarily, the pixel pitch of the LCG in FIG. 3 is 4 µm. The minimum number of gratings refers to the number of gratings of the liquid crystal layer 203 of FIG. 3 in the X direction. The grating period of a single grating in FIG. 3 is d, and the magnitude of the grating period d may be determined through the grouping of the pixel electrodes 2021. Exemplarily, with reference to FIG. 2, a single pixel electrode 2021 extends in the Y direction, a plurality of pixel electrodes 2021 are arranged in the X direction, adjacent three pixel electrodes 2021 are taken as a group, and the drive voltage of each group of pixel electrodes 2021 is controlled so that the phase variations of liquid crystals in the liquid crystal layer 203 are periodically arranged, and correspondingly, the optical characteristics such as the refractive index of light by the liquid crystal vary periodically, forming liquid crystal gratings having a periodic structure and the grating period of d. The liquid crystal grating has a deflection effect on the image emitted from the display module 20 and may deflect the image in at least one direction.

With reference to Table 3, the first light emission wavelength $\lambda_B$ is 0.442 um, the second light emission wavelength $\lambda_G$ is 0.532 um, and the third light emission wavelength $\lambda_R$ is 0.638 um. It is to be noted that the display apparatus further includes light of other wavelengths, such as white light, or light different from light of $\lambda_B$, $\lambda_G$, and $\lambda_R$, which are not shown here one by one. With reference to the formula (1.1), since the light wavelengths of $\lambda_B$, $\lambda_G$ and $\lambda_R$ are different, the maximum deflection angles of the liquid crystal gratings for light of different colors are different under the conditions of the same LCG pitch and the minimum number of gratings. For example, with reference to the formula (1.1), when the LCG pitch is 4 µm and the minimum number of gratings is three, the maximum deflection angle $\alpha_{B1}$ for $\lambda_B$ by a single LCG is 2.11°, the maximum deflection angle $\alpha_{G1}$ for $\lambda_G$ by a single LCG is 2.54°, and the maximum deflection angle $\alpha_{R1}$ for $\lambda_R$ by a single LCG is 3.05°. When three liquid crystal gratings stacked with a stacking angle of $(0°+45°\times2)$ are adopted, the maximum deflection angle $\alpha_{B3}$ for $\lambda_B$ is 5.10°, the maximum deflection angle $\alpha_{G3}$ for $\lambda_G$ is 6.13°, and the maximum deflection angle $\alpha_{R3}$ for $\lambda_R$ is 7.36°.

In an example, with continued reference to Table 2, Table 3 and FIG. 9, the display apparatus 200 adopting a single LCG and $\alpha_3 = \alpha_{B1} = 2.11°$ are used as an example. It is merely necessary to set that $\theta_{max} \geq \alpha_2 - \alpha_3$, where $\alpha_2 - \alpha_3 = 10.42° - 2.11° = 8.31°$, that is, the rotation angle $\theta_{max}$ of the actuation device is set as follows: $\theta_{max} \geq 8.31°$. In an example, when the maximum movement distance $\Delta x_{max}$ is beyond the movement range of the user, the actuation device drives the display module 20 to rotate by an angle in the angle range of zero to 8.31°; and when the maximum movement distance $\Delta x_{max}$ is within the movement range of the user, the actuation device drives the display module 20 to rotate by an angle greater than 8.31°. Through such angle setting, the deflection device can deflect the image to the maximum deflection position. The actuation device is added so that the number of deflection devices stacked can be reduced, the power consumption of the deflection devices can be reduced, the design difficulty of the image deflection by the deflection device in a large viewing angle can be reduced, and the deflection efficiency of the deflection device can be improved.

In an example, with continued reference to Table 2, Table 3 and FIG. 9, the display apparatus 200 adopting three stacked LCGs and $\alpha_3 = \alpha_{B3} = 5.10°$ are used as an example. The rotation angle $\theta_{max}$ by which the actuation device mechanically rotates the display area AA of the display module with the central axis L of the display module as the rotation axis is set as follows: $\theta_{max} \geq \alpha_2 - \alpha_3$, where $\alpha_2 - \alpha_3 = 10.42° - 5.10° = 5.32°$. In an example, when the maximum movement distance $\Delta x_{max}$ is beyond the movement range of the user, the actuation device drives the display module 20 to rotate by an angle in the angle range of zero to 5.32°; and when the maximum movement distance $\Delta x_{max}$ is within the movement range of the user, the actuation device drives the display module 20 to rotate by an angle greater than 5.32°. Through such angle setting, the deflection device can deflect the image to the maximum deflection position, thus ensuring the deflection ability of the deflection device.

On the basis of the preceding embodiments, the actuation device and the deflection device make the image move in the same direction. The actuation device has a plurality of actuation modes, and the display apparatus further includes a second actuation mode and a unit deflection threshold. In the second actuation mode, the display apparatus controls starting of the deflection device and the actuation device according to the ratio of the movement distance of the human eye in the first direction to the unit deflection threshold so as to move the image to the human eyes. The second actuation mode includes a fifth state and a sixth state.

In the fifth state, when the ratio of the movement distance of a human eye in the first direction to the unit deflection threshold is less than 1, the deflection device is started and the actuation device is closed.

Exemplarily, with continued reference to FIG. 6 to FIG. 9, taking the first direction as the X direction as an example, the actuation device and the deflection device each may make the image move in the X direction. In a case where the ratio of the movement distance of the human eyes in the X direction when the movement direction of the human eyes is projected on the XOY plane to the unit deflection threshold is less than 1, the actuation device is closed, and merely the deflection device needs to be started to deflect the image in the X direction to the human eye.

In the sixth state, when the ratio of the movement distance of a human eye in the first direction to the unit deflection threshold is greater than or equal to 1, the deflection device is started and the actuation device is started.

Exemplarily, with reference to FIG. 6 to FIG. 9, the ratio of the movement distance of the human eye in the X direction to the unit deflection threshold is greater than or equal to 1, the actuation device is started, and the deflection device is started. The actuation device continues to rotate the display area AA of the display apparatus so as to make the image move in the direction in which the deflection device cannot make the image reach, so that the image is observed by the user.

On the basis of the preceding embodiments and with continued reference to FIG. 9, the integer of the ratio of the movement distance in the first direction to the unit deflection threshold is N, where N≥1, and N is a positive integer.

In the sixth state, the operation of starting the actuation device includes that the actuation device makes the image rotate in a movement direction of the human eye by N first unit rotation amplitudes. The first unit rotation amplitude is an angle by which the actuation device drives the display module to rotate in the movement direction of the human eye when the human eye moves in the first direction by one unit on the first plane.

In an example, the unit deflection threshold is set to 1 cm, and the first unit rotation amplitude is set to 1°. With reference to FIG. 9, in the sixth state, when the integer of the ratio of the movement distance in the X direction to the unit deflection threshold is N, the actuation device drives the display area AA of the display module to rotate about the rotation axis L of the display module by N° in the movement direction of the human eyes. The second actuation mode is set so that the rotation angle of the actuation device is a fixed amplitude. Therefore, it is not necessary to calculate the corresponding deflection angle when the human eyes move in the X direction on the XOY plane. Such actuation mode is simple and easy to implement and can compensate for the deflection angle of the image caused by the deflection device to a certain extent, improving the visual effect.

On the basis of the preceding embodiments, the unit deflection threshold includes a horizontal unit rotation amplitude and a vertical unit rotation amplitude, and the horizontal unit rotation amplitude is greater than the vertical unit rotation amplitude.

The horizontal unit rotation amplitude refers to an angle by which the actuation device drives the display module to rotate in the horizontal component direction of the movement direction of the human eyes when the human eyes move in the horizontal component direction of the first direction by one unit on the first plane. The vertical unit rotation amplitude refers to an angle by which the actuation device drives the display module to rotate in the vertical component direction of the movement direction of the human eyes when the human eyes move in the vertical component direction of the first direction by one unit on the first plane.

In an example, with continued reference to FIG. 6, the actuation device and the deflection device may make the image move along the X direction and also make the image move along the Y direction. It is considered that the movement range of the human eyes in the horizontal direction is wider than the movement range of the human eyes in the vertical direction, so the horizontal unit rotation amplitude may be further set to be greater than the vertical unit rotation amplitude so as to meet a wider movement range of the human eyes in the horizontal direction.

Figure 10:
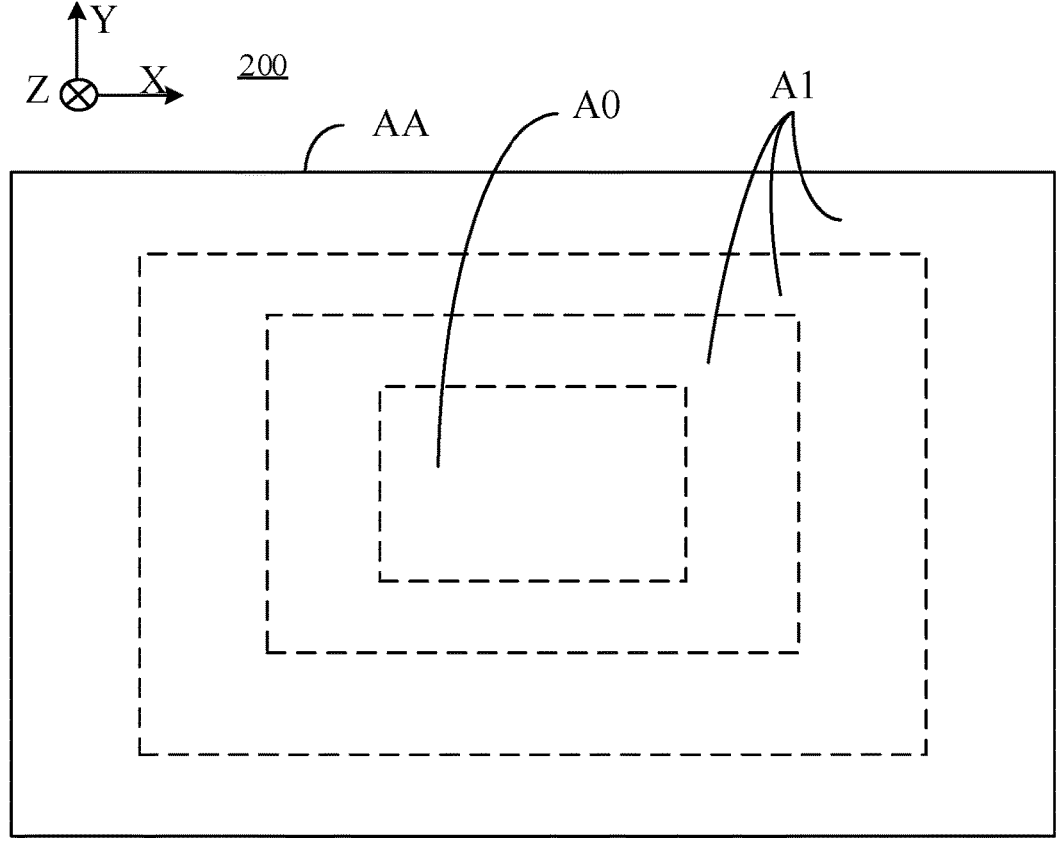
FIG. 10 is a structural view of another display apparatus according to an embodiment of the present disclosure.

FIG. 10 is a structural view of another display apparatus according to an embodiment of the present disclosure.

On the basis of the preceding embodiments and with continued reference to FIG. 10, a display apparatus 200 includes a movement area, the movement area includes a central area A0 and at least one edge area A1 on the first plane, and the edge area A1 surrounds the central area A0. An offset threshold corresponding to the central area A0 is less than an offset threshold corresponding to the edge area A1.

With reference to FIG. 10, when the projection of the movement direction of the human eyes on the XOY plane is located in the movement area of the display apparatus 200, an offset threshold corresponding to such area exists. The movement area is divided into the central area A0 and at least one edge area A1. In most cases, the human eyes face the center of the display screen, and the offset threshold corresponding to the central area A0 is set to be less than the offset threshold corresponding to the edge area A1.

In an example and with continued reference to Table 1, the offset threshold may be the amount of movement in units of millimeters (mm). The offset threshold corresponding to the central area A0 is set to 1 mm and the offset threshold corresponding to the edge area A1 is set to 2 mm. Through such setting, the sensitivity of the actuation device and the sensitivity of the deflection device in the central area A0 can be made higher than the sensitivity in the edge area A1 for the movement direction of the human eye, so as to meet more use requirements when the human eyes face the center of the display screen.

In the second state and the fourth state in the preceding embodiments, when the human eyes move in the central area A0 and in a case where the movement distance of the human eyes is greater than the offset threshold of 1 mm corresponding to the central area A0, the deflection device and the actuation device are controlled to start; and when the human eyes move in the edge area A1 and in a case where the movement distance of the human eyes is greater than the offset threshold of 2 mm corresponding to the edge area A1, the deflection device and the actuation device are controlled to start.

In an example, with continued reference to Table 1, the offset threshold may be the unit deflection threshold in units of millimeters (mm) and corresponds to the unit rotation amplitude in units of degrees (°). The unit deflection threshold corresponding to the central area A0 is set to 1 mm and the unit rotation amplitude corresponding to the central area A0 is set to 1°. The unit deflection threshold corresponding to the edge area A1 is set to 2 mm, and the unit rotation amplitude corresponding to the edge area A1 is set to 1.5°.

In the sixth state provided in the preceding embodiment, when the human eyes move in the central area A0, in a case where the integer of the ratio of the movement distance of the human eyes to the unit deflection threshold is N1, the actuation device drives the display area AA of the display module to rotate by N1° in the movement direction of the human eyes; and when the human eyes move in the edge area A1, in a case where the integer of the ratio of the movement distance of the human eyes to the unit deflection threshold is N2, the actuation device drives the display area AA of the display module to rotate by 1.5N2° in the movement direction of the human eyes.

The offset thresholds of the central area and the edge area are set differently so that the sensitivity of the central area can be made higher than the sensitivity of the edge area. When the user moves facing the center of the screen, the deflection device and the actuation device have relatively high sensitivity so as to compensate for the deflection angle of the image caused by the deflection device, thereby improving the visual effect.

Further, with continued reference to FIG. 10, offset thresholds corresponding to a plurality of edge areas A1 are set to sequentially increase in a direction away from the central area, facilitating a gradual increase in sensitivity of the deflection device and the actuation device in a direction closer to the central area.

On the basis of the preceding embodiments and with continued reference to FIG. 7, the display apparatus 200 includes a first monitoring range Z1, a second monitoring range Z2, and a third monitoring range Z3 which are arranged in sequence in a direction parallel to a light emission direction (as shown in the Z direction) of the display apparatus from a front viewing angle. An offset threshold corresponding to the first monitoring range Z1 and an offset threshold corresponding to the third monitoring range Z3 each are greater than an offset threshold corresponding to the second monitoring range Z2.

In an embodiment, the display module may further include other optical elements such as the focusing optics (not shown in the figure) for focusing the image to the human eyes. A plurality of viewing ranges are provided along the light emission direction of the display apparatus from the front viewing angle. The second monitoring range Z2 is an optimal viewing range of the display apparatus.

In some applications, such as holographic 3D display, the offset threshold corresponding to the second monitoring range Z2 is set to be less than the offset thresholds corresponding to the other monitoring ranges, that is, the offset threshold corresponding to the second monitoring range Z2 is less than the offset threshold corresponding to the first monitoring range Z1 and the offset threshold corresponding to the third monitoring range Z3 at the same time, so that the sensitivity of both the deflection device and the actuation device is ensured in the optimal viewing range.

On the basis of the preceding embodiments, the display apparatus includes a plurality of display modes including a game mode and a video mode. An offset threshold corresponding to the game mode is less than an offset threshold corresponding to the video mode.

In an embodiment, the display apparatus has a plurality of display modes, for example, in some applications, such as a game mode, a video mode, a picture mode and a text mode for different viewing requirements. The user typically has different movement ranges when viewing and may need different screen movement and rotation requirements.

For example, when the display apparatus is in the game mode, the offset threshold is set to be smaller; and/or when the display apparatus is turned to the video mode, the offset threshold becomes larger; and/or, in the game mode, the amplitude by which the actuation device rotates the display screen is set to be smaller, and when the display apparatus is turned to the video mode, the amplitude by which the actuation device rotates the display screen is set to be larger. Different offset thresholds are set according to different display modes so that the display apparatus achieves an optimal display effect.

On the basis of the preceding embodiments and with continued reference to FIG. 1, the display apparatus further includes a monitoring module 40 and a control module 10. The monitoring module 40 is configured to monitor a movement parameter of human eyes presented on the first plane. The control module 10 is configured to control, according to a comparison result of the movement parameter and an offset threshold, an actuation state of the actuation device and a deflection state of the deflection device. The movement parameter includes the movement distance of the human eyes in the first direction on the first plane.

Exemplarily, with continued reference to FIG. 7 to FIG. 9, during use of the display apparatus, the monitoring module monitors in real time the movement distance of the human eye in the X direction and/or the Y direction on the XOY plane. The control module compares the obtained movement distance in the X direction with the offset threshold in the X direction and/or compares the obtained movement distance in the Y direction with the offset threshold in the Y direction. In combination with the first state to the sixth state provided in the preceding embodiments, the starting states of the actuation device and the deflection device are controlled according to the comparison result so that the image is deflected to the human eyes.

On the basis of the preceding embodiments, the control module further includes a to-be-monitored user determination unit configured to determine a to-be-monitored user according to a preset monitoring condition.

When the observer is more than one person, different situations may exist, and the to-be-monitored user determination unit detects merely the movement distance of the human eye meeting the preset monitoring condition in the first direction on the first plane. A plurality of preset monitoring conditions may be set.

In an example, the preset monitoring condition may be to detect the human eye closest to the screen.

In an example, the preset monitoring condition may be to detect merely human eyes within a distance from the screen.

In an example, the preset monitoring condition may be to detect different human eyes, for example, a human eye that meets a first distance range from the screen, a human eye that meets a second distance range from the screen, or the like.

On the basis of the preceding embodiments, when the number of to-be-monitored users is greater than 1, the to-be-monitored user determination unit is further configured to acquire the maximum movement distance of a human eye in the first direction on the first plane among the to-be-monitored users.

The control module is configured to control, according to the comparison result of the maximum movement distance and the offset threshold, the actuation state of the actuation device and the deflection state of the deflection device.

When a plurality of human eyes simultaneously move in front of the screen, the to-be-monitored user determination unit acquires the maximum movement distance of the human eye in the first direction on the first plane among the plurality of to-be-monitored users. The maximum movement distance is compared with the offset threshold. In combination with the first state to the sixth state provided in the preceding embodiments, the starting states of the actuation device and the deflection device are controlled so that the image is deflected to the eyes of all users.

Figure 11:
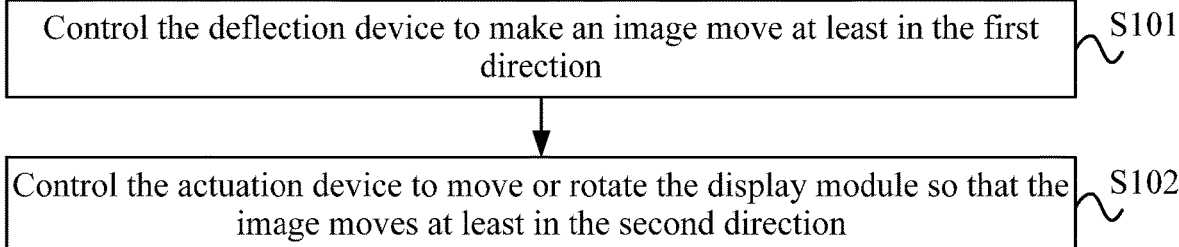
FIG. 11 is a diagram of a method for controlling a display apparatus according to an embodiment of the present disclosure.

Based on the same inventive concept, an embodiment of the present disclosure further provides a method for controlling a display apparatus. The method is used for driving the display apparatus provided in the preceding embodiments. FIG. 11 is a diagram of a method for controlling a display apparatus according to an embodiment of the present disclosure. With reference to FIG. 5, FIG. 6 and FIG. 11, the method for controlling a display apparatus provided in the embodiment of the present disclosure includes the steps described below.

In S101, the deflection device is controlled to make an image move at least in a first direction.

In S102, the actuation device is controlled to move or rotate the display module so that the image moves at least in a second direction.

The first direction is the same as or different from the second direction; the first direction and the second direction each are parallel to a first plane, and the first plane is parallel to a plane where the deflection device is disposed.

With reference to FIG. 5 and FIG. 6, in some application scenarios, when the user moves, the deflection device may move the image in at least one component direction on the plane in which the deflection device is located along the movement direction of the user's eyes, the actuation device may make the image move in at least one component direction on the plane in which the deflection device is located along the movement direction of the user's eyes, and the actuation device may assist the deflection device in deflecting the image to the user's eyes by mechanically moving or rotating the display module.

The deflection device and the actuation device make the image move in the same direction, and the actuation device may compensate for the deflection of the image by the deflection device in the same direction. Alternatively, the deflection device and the actuation device make the image move in different directions, and the actuation device may make the image move in a different direction.

In an example, with continued reference to FIG. 4, the direction in which the deflection device makes the image move is the X direction and the direction in which the actuation device makes the image move is the Y direction.

In an example, with continued reference to FIG. 5, the directions in which the deflection device and the actuation device make the image move are both the X direction.

In an example, with reference to FIG. 6, the deflection device and the actuation device may both make the image move in the X direction and both make the image move in the Y direction.

FIG. 12 is a diagram of a method for controlling a display apparatus according to an embodiment of the present disclosure.

On the basis of the preceding embodiments, the first direction is different from the second direction and the display apparatus includes a second direction offset threshold. With reference to FIG. 12, the method for controlling a display apparatus provided in an embodiment of the present disclosure includes the steps described below.

In S201, a movement distance of a human eye in the first direction on the first plane and a movement distance of the human eye in the second direction on the first plane are acquired.

With continued reference to FIG. 4, the direction in which the deflection device makes the image move is the X direction and the direction in which the actuation device makes the image move is the Y direction. The monitoring module of the display apparatus acquires the movement distances of the human eyes on the XOY plane in the X direction and in the Y direction.

In S202, in the first state, when a movement distance of a human eye in the second direction is less than or equal to the second direction offset threshold, the deflection device is controlled to start and the actuation device is controlled to close.

When the movement distance of the human eye in the Y direction is less than or equal to the offset threshold in the Y direction, the control module merely needs to control the deflection device to follow the user's eyes to move the image in the X direction so that the image enters the user's eyes. The starting condition of the actuation device is set so that frequent starting of the actuation device can be avoided and the user experience can be improved.

In S203, in the second state, when a movement distance of a human eye in the second direction is greater than the second direction offset threshold, the deflection device is controlled to start and the actuation device is controlled to start.

When the movement distance of the human eye in the Y direction is greater than the offset threshold in the Y direction, the control module controls the deflection device to follow the user's eyes to move the image in the X direction and controls the actuation device to start to follow the user's eyes to make the image move in the Y direction. The deflection device and the actuation device act together to deflect the image to the user's eyes. The actuation device and the deflection device are configured to adjust the image in different directions so that the number of liquid crystal gratings can be saved and the preparation difficulty and power consumption of the liquid crystal gratings can be reduced.

FIG. 13 is a diagram of a method for controlling a display apparatus according to an embodiment of the present disclosure.

On the basis of the preceding embodiments, the first direction is the same as the second direction and the display apparatus includes a first actuation mode and a first direction offset threshold. The first actuation mode includes a third state and a fourth state. With reference to FIG. 13, the method for controlling a display apparatus provided in an embodiment of the present disclosure includes the steps described below.

In S301, it is determined that an actuation mode of the display apparatus is the first actuation mode.

In S302, a movement distance of a human eye in the first direction on the first plane is acquired.

In S303, the movement distance is compared with the first direction offset threshold.

Exemplarily, with continued reference to FIG. 5, the directions in which the deflection device and the actuation device make the image move each are the X direction. The control module of the display apparatus acquires the movement distance of the human eye in the X direction on the XOY plane and compares the movement distance in the X direction with the offset threshold in the X direction. Alternatively, with continued reference to FIG. 6, the deflection device and the actuation device may both make the image move in the X direction and also in the Y direction. The control module of the display apparatus acquires the movement distances of the human eyes on the XOY plane in the X direction and in the Y direction, compares the movement distance in the X direction with the offset threshold in the X direction, and compares the movement distance in the Y direction with the offset threshold in the Y direction.

In S304, in the third state, when the movement distance of the human eye in the first direction is less than or equal to the first direction offset threshold, the deflection device is controlled to start, and the actuation device is controlled to close.

The first direction offset threshold includes an offset threshold in the X direction and an offset threshold in the Y direction.

In an example, with continued reference to FIG. 7, the offset threshold in the X direction is the maximum movement distance $\Delta x_{max}$ by which the deflection device deflects the image from the front viewing angle of the human eyes relative to the XOY plane along the X direction to the maximum squint angle; and the offset threshold in the Y direction is the maximum movement distance (not shown in the figure) by which the deflection device deflects the image from the front viewing angle of the human eyes relative to the XOY plane along the Y direction to the maximum squint angle.

When the movement distance of the human eye in the X direction is less than or equal to the offset threshold $\Delta x_{max}$ in the X direction, the control module merely needs to control the deflection device to follow the user's eyes to move the image in the X direction so that the image enters the user's eyes. The starting condition of the actuation device is set so that frequent starting of the actuation device can be avoided and the user experience can be improved.

In S305, in the fourth state, when the movement distance of the human eye in the first direction is greater than the first direction offset threshold, the deflection device is controlled to start, and the actuation device is controlled to start.

With continued reference to FIG. 7, when the movement distance of the human eye in the X direction is greater than the offset threshold ($\Delta x_{max}$) in the X direction, the control module controls the deflection device and the actuation device to follow the user's eyes to move the image in the X direction; and/or when the movement distance of the human eye in the Y direction is greater than the offset threshold in the Y direction, the control module controls the deflection device and the actuation device to follow the user's eye to move the image in the Y direction. The deflection device and the actuation device act together to deflect the image to the user's eyes. The actuation device is configured to adjust the image in the same direction as the deflection device so that the number of liquid crystal gratings can be saved and the preparation difficulty and power consumption of the liquid crystal gratings can be reduced.

The X direction is parallel to the horizontal component direction, and the Y direction is parallel to the vertical component direction. Further, the offset threshold in the X direction may be set to be less than the offset threshold in the Y direction so that the user can move in a wide range in the horizontal direction. In an example, with continued reference to FIG. 7, the offset threshold in the X direction and the offset threshold in the Y direction may also be preset values. For example, the offset threshold in the X direction is 1 cm and the offset threshold in the Y direction is 1.5 cm.

Figure 14:
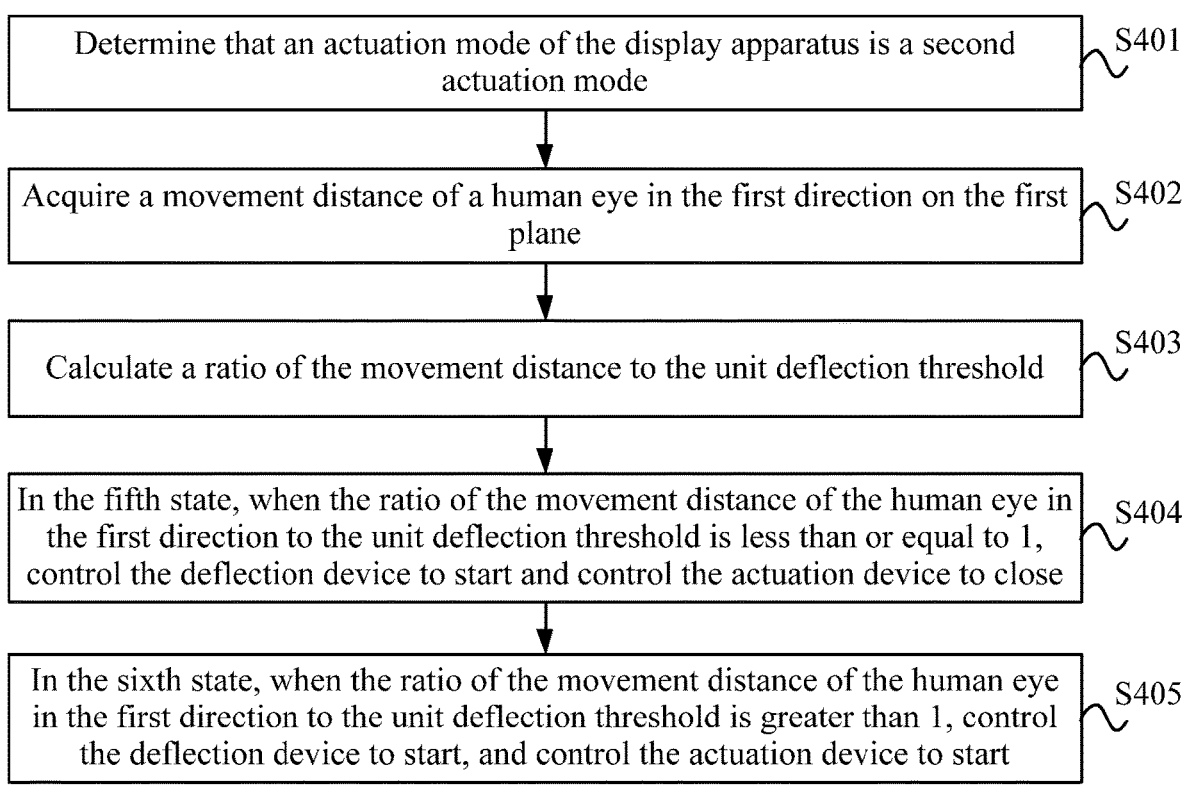
FIG. 14 is a diagram of another method for controlling a display apparatus according to an embodiment of the present disclosure.

FIG. 14 is a diagram of a method for controlling a display apparatus according to an embodiment of the present disclosure.

On the basis of the preceding embodiments, the first direction is the same as the second direction and the display apparatus includes a second actuation mode and a unit deflection threshold. With reference to FIG. 14, another method for controlling a display apparatus provided in an embodiment of the present disclosure includes the steps described below.

In S401, it is determined that an actuation mode of the display apparatus is the second actuation mode.

In S402, a movement distance of a human eye in the first direction on the first plane is acquired.

In S403, a ratio of the movement distance to the unit deflection threshold is calculated.

In S404, in the fifth state, when the ratio of the movement distance of the human eye in the first direction to the unit deflection threshold is less than or equal to 1, the deflection device is controlled to start and the actuation device is controlled to close.

In S405, in the sixth state, when the ratio of the movement distance of the human eye in the first direction to the unit deflection threshold is greater than 1, the deflection device is controlled to start, and the actuation device is controlled to start.

In an example, with continued reference to FIG. 5, the directions in which the deflection device and the actuation device make the image move each are the X direction. The control module of the display apparatus acquires the movement distance of the human eye in the X direction on the XOY plane and calculates the ratio of the movement distance in the X direction to the unit deflection threshold in the X direction.

When the ratio of the movement distance to the unit deflection threshold in the X direction is less than or equal to 1, the actuation device is closed, and the control module merely needs to control the deflection device to follow the user's eyes to move the image in the X direction so that the image enters the user's eyes. When the ratio of the movement distance to the unit deflection threshold in the X direction is greater than 1, the control module controls the deflection device and the actuation device to simultaneously follow the user's eyes to move the image in the X direction, and the deflection device and the actuation device act together to deflect the image to the user's eyes.

On the basis of the preceding embodiments, the unit deflection threshold includes a unit deflection threshold in the X direction and a unit deflection threshold in the Y direction.

In an example, with continued reference to FIG. 6, the deflection device and the actuation device may both make the image move in the X direction and in the Y direction. The control module of the display apparatus acquires the movement distances of the human eye on the XOY plane in the X direction and in the Y direction, calculates the ratio of the movement distance in the X direction to the unit deflection threshold in the X direction, and calculates the ratio of the movement distance in the Y direction to the unit deflection threshold in the Y direction.

In the fifth state, when the ratio of the movement distance of the human eyes on the XOY plane in the X direction to the unit deflection threshold in the X direction is less than or equal to 1, the actuation device is closed, and the control module merely needs to control the deflection device to follow the user's eyes to move the image in the X direction. When the ratio of the movement distance of the human eyes on the XOY plane in the Y direction to the unit deflection threshold in the Y direction is less than or equal to 1, the actuation device is closed, and the control module merely needs to control the deflection device to follow the user's eyes to move the image in the Y direction, and the deflection device is used to deflect the image to the user's eyes.

In the sixth state, when the ratio of the movement distance of the human eyes on the XOY plane in the X direction to the unit deflection threshold in the X direction is greater than 1, the control module controls the deflection device and the actuation device to simultaneously follow the user's eyes to move the image in the X direction. When the ratio of the movement distance of the human eye on the XOY plane in the Y direction to the unit deflection threshold in the Y direction is greater than 1, the control module controls the deflection device and the actuation device to simultaneously follow the user's eyes to move the image in the Y direction. According to the ratio, the starting and closing of the deflection device and the actuation device are controlled so that the deflection device and the actuation device act together to deflect the image to the user's eye.

On the basis of the preceding embodiments, in the sixth state, the integer of the ratio of the movement distance of the human eye in the first direction to the unit deflection threshold is calculated and obtained to be N, N≥2, and N is a positive integer.

In S405, the operation of controlling the actuation device to start includes controlling the deflection device to deflect the image and controlling the actuation device to drive the display module to rotate so as to rotate the image in a movement direction of the human eye by N first unit rotation amplitudes so that the image is incident into the human eye.

In an example, the unit deflection threshold is set to 1 cm, and the first unit rotation amplitude is set to 1°. In the sixth state, when the integer of the ratio of the movement distance of the human eyes in the X direction to the unit deflection threshold is N, the actuation device drives the display area AA of the display module to rotate by N° in the movement direction of the human eyes, so that the image moves in the X direction to the user's eyes. The second actuation mode is set in the present application, and the rotation angle of the actuation device is a fixed amplitude. Therefore, it is not necessary to calculate the corresponding deflection angle when the human eyes move in the X direction on the XOY plane. Such actuation mode compensates for the deflection angle of the image caused by the deflection device to a certain extent, improving the visual effect.

On the basis of the preceding embodiments, the first direction is the same as or different from the second direction. Before the steps 101, 201, 301 and 401, the method for controlling the display apparatus provided in the embodiments of the present disclosure further includes the steps described below.

A display mode of the display apparatus is determined.

In an embodiment, the display apparatus may have a plurality of display modes, such as a game mode, a video mode, a picture mode, a text mode, and the like in some applications.

An offset threshold corresponding to the display mode is determined according to the display mode.

In an embodiment, the corresponding offset thresholds may be set for different viewing requirements and for different modes so as to meet movement ranges of users in different modes and to meet different screen movement and rotation requirements, which has the same beneficial effects as the preceding embodiments.

On the basis of the preceding embodiments, the first direction is the same as or different from the second direction. Before the steps 101, 201, 301 and 401, the method for controlling the display apparatus provided in the embodiment of the present disclosure further includes the steps described below.

A movement area of a movement direction of a human eye on the first plane is determined.

An offset threshold corresponding to the movement area is determined according to the movement area.

With continued reference to FIG. 10, in a case where the projection of the movement direction of the human eye on the XOY plane is located in the movement area of the display apparatus 200, an offset threshold corresponding to such area exists. The movement area is divided into the central area A0 and at least one edge area A1. The offset thresholds corresponding to the central area A0 and the edge area A1 are set to be different. Further, the offset threshold corresponding to the central area A0 is set to be less than the offset threshold corresponding to the edge area A1, which has the same beneficial effects as the preceding embodiments.

On the basis of the preceding embodiments, the first direction is the same as or different from the second direction. Before the steps 101, 201, 301 and 401, the method for controlling the display apparatus provided in the embodiment of the present disclosure further includes the steps described below.

A to-be-monitored user corresponding to the display apparatus is determined.

The maximum movement distance of a human eye of the to-be-monitored user in the first direction on the first plane is acquired.

According to a comparison result of the maximum movement distance and an offset threshold, the deflection device is controlled to make the image move in the first direction.

When a plurality of human eyes simultaneously move in front of the screen, the to-be-monitored user determination unit acquires the movement distances of the human eyes of a plurality of to-be-monitored users in the first direction on the first plane. The maximum movement distance among the movement distances is acquired and compared with the offset threshold. In combination with the first state to the sixth state provided in the preceding embodiments, the starting states of the actuation device and the deflection device are controlled so that the image is deflected to the eyes of all users, which has the same beneficial effects as the preceding embodiments.

Figure 15:
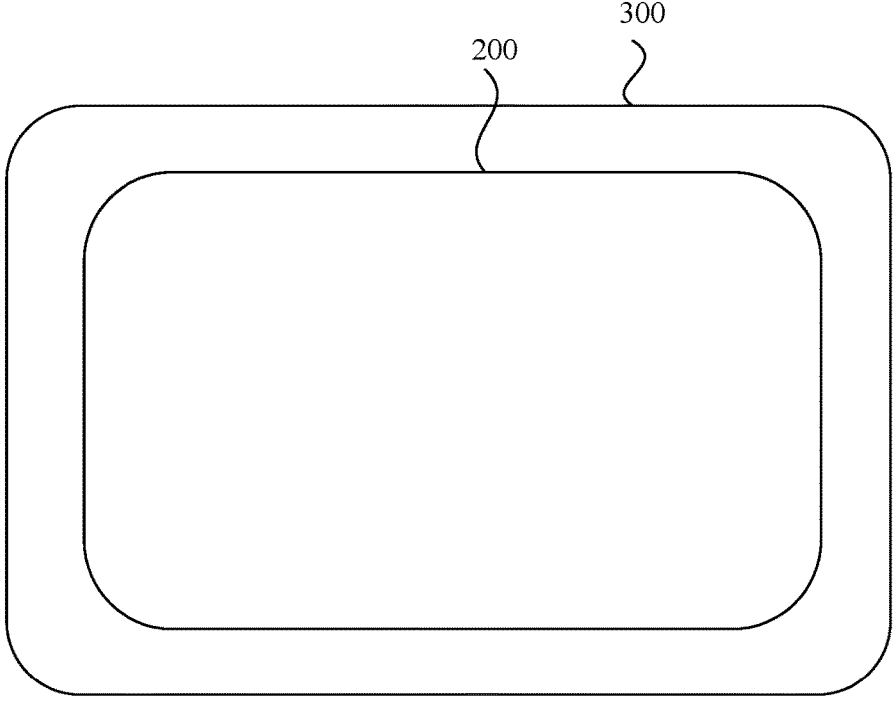
FIG. 15 is a structural view of a holographic 3D display screen according to an embodiment of the present disclosure.

Based on the same inventive concept, an embodiment of the present disclosure further provides a holographic 3D display screen including the display apparatus provided in any preceding embodiment. FIG. 15 is a structural view of a holographic 3D display screen according to an embodiment of the present disclosure. As shown in FIG. 15, the holographic 3D display screen includes the display apparatus provided in any preceding embodiment. Exemplarily, as shown in FIG. 15, the holographic 3D display screen includes a display apparatus 200. Therefore, the display apparatus also has the beneficial effects of the display apparatus described in the preceding embodiments, and for the same details, reference may be made to the description of the preceding display apparatuses, and repetition will not made herein.

The holographic 3D display screen provided in the embodiment of the present disclosure may be a desktop display shown in FIG. 15 or may be any electronic product having the display function, including but not limited to the following categories: a television set, an in-vehicle display, industrial control equipment, a medical display screen and a touch interactive terminal, which is not particularly limited in the embodiments of the present disclosure.

It is to be noted that the preceding are merely alternative embodiments of the present disclosure and technical principles used therein. It is to be understood by those skilled in the art that the present disclosure is not limited to the embodiments described herein. For those skilled in the art, various apparent changes, readjustments, and substitutions can be made without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display apparatus, comprising a display module and an adjustment module;

wherein the display module comprises a deflection device configured to make an image move at least in a first direction, and the deflection device comprises a liquid crystal grating (LCG);

wherein the adjustment module comprises an actuation device, and the actuation device is configured to move or rotate the display module to make the image move at least in a second direction; and wherein the first direction is same as or different from the second direction; the first direction and the second direction each are parallel to a first plane, and the first plane is parallel to a plane where the deflection device is disposed.

2. The display apparatus of claim 1, comprising a first monitoring range, a second monitoring range, and a third monitoring range, wherein the first monitoring range, the second monitoring range, and the third monitoring range are arranged in sequence in a direction parallel to a light emission direction of the display apparatus from a front viewing angle; and an offset threshold corresponding to the first monitoring range and an offset threshold corresponding to the third monitoring range each are greater than an offset threshold corresponding to the second monitoring range.

3. The display apparatus of claim 1, comprising a plurality of display modes, wherein the plurality of display modes comprise a game mode and a video mode; and an offset threshold corresponding to the game mode is less than an offset threshold corresponding to the video mode.

4. The display apparatus of claim 1, comprising a movement area, wherein the movement area comprises a central area and at least one edge area on the first plane, and the at least one edge area surrounds the central area; and an offset threshold corresponding to the central area is less than an offset threshold corresponding to the at least one edge area.

5. The display apparatus of claim 4, wherein offset thresholds corresponding to a plurality of edge areas among the at least one edge area sequentially increase in a direction away from the central area.

6. The display apparatus of claim 1, further comprising:

a monitoring module configured to monitor a movement parameter of a human eye presented on the first plane; wherein the movement parameter comprises a movement distance of the human eye in the first direction on the first plane; and a control module configured to control, according to a comparison result of the movement parameter and an offset threshold, an actuation state of the actuation device and a deflection state of the deflection device.

7. The display apparatus of claim 6, wherein the control module comprises a to-be-monitored user determination unit, and the to-be-monitored user determination unit is configured to determine a to-be-monitored user according to a preset monitoring condition.

8. The display apparatus of claim 6, wherein in a case where a number of to-be-monitored users is greater than 1, the to-be-monitored user determination unit is further configured to acquire a maximum movement distance of a human eye among the to-be-monitored users in the first direction on the first plane; and wherein the control module is configured to control, according to a comparison result of the maximum movement distance and the offset threshold, the actuation state of the actuation device and the deflection state of the deflection device.

9. The display apparatus of claim 1, wherein the first direction is different from the second direction.

10. The display apparatus of claim 9, comprising a second direction offset threshold; wherein in a first state, in a case where a movement distance of a human eye in the second direction is less than or equal to the second direction offset threshold, the deflection device is started and the actuation device is closed; and in a second state, in a case where the movement distance of the human eye in the second direction is greater than the second direction offset threshold, the deflection device is started and the actuation device is started.

11. The display apparatus of claim 10, wherein the second direction offset threshold comprises a second sensitive threshold, and the second sensitive threshold is a minimum resolution distance of the human eye in the second direction on the first plane for the image.

12. The display apparatus of claim 1, wherein the first direction is the same as the second direction.

13. The display apparatus of claim 12, wherein a maximum movement distance by which the actuation device makes the image move in the first direction is greater than a maximum movement distance by which the deflection device makes the image move in the first direction.

14. The display apparatus of claim 12, comprising a second actuation mode and a unit deflection threshold, wherein the second actuation mode comprises a fifth state and a sixth state;

wherein in the fifth state, in a case where a ratio of a movement distance of a human eye in the first direction to the unit deflection threshold is less than 1, the deflection device is started and the actuation device is closed; and in the sixth state, in a case where the ratio of the movement distance of the human eye in the first direction to the unit deflection threshold is greater than or equal to 1, the deflection device is started and the actuation device is started.

15. The display apparatus of claim 14, wherein an integer of the ratio of the movement distance in the first direction to the unit deflection threshold is N, wherein $N \geq 1$, and N is a positive integer;

wherein in the sixth state, the actuation device being started comprises: making, by the actuation device, the image rotate in a movement direction of the human eye by N first unit rotation amplitudes;

wherein each of the N first unit rotation amplitudes is an angle by which the actuation device drives the display module to rotate in the movement direction of the human eye when the human eye moves in the first direction by one unit on the first plane.

16. The display apparatus of claim 14, wherein the unit deflection threshold comprises a horizontal unit rotation amplitude and a vertical unit rotation amplitude, and the horizontal unit rotation amplitude is greater than the vertical unit rotation amplitude.

17. The display apparatus of claim 12, comprising a first actuation mode and a first direction offset threshold, wherein the first actuation mode comprises a third state and a fourth state;

wherein in the third state, in a case where a movement distance of a human eye in the first direction is less than or equal to the first direction offset threshold, the deflection device is started and the actuation device is closed; and in the fourth state, in a case where the movement distance of the human eye in the first direction is greater than the first direction offset threshold, the deflection device is started and the actuation device is started.

18. The display apparatus of claim 17, wherein the first direction offset threshold comprises a first sensitive threshold, and the first sensitive threshold is a minimum resolution distance of the human eye in the first direction on the first plane for the image.

19. The display apparatus of claim 17, wherein the first direction offset threshold comprises a first maximum deflection distance, and the first maximum deflection distance is a maximum movement distance by which the deflection device deflects the image from a front viewing angle of the human eye relative to the first plane along the first direction to a maximum squint angle.

20. The display apparatus of claim 17, wherein the first direction offset threshold comprises a horizontal direction threshold and a vertical direction threshold, and the horizontal direction threshold is less than the vertical direction threshold.

21. The display apparatus of claim 20, wherein a maximum movement distance by which the actuation device makes the image move in a horizontal direction is greater than a maximum movement distance by which the actuation device makes the image move in a vertical direction.

22. The display apparatus of claim 17, wherein the human eye comprises a right pupil;

wherein an initial deflection angle of the right pupil by which the deflection device deflects the image to a front viewing angle of the human eye relative to the first plane is $\alpha_1$, and a maximum deflection angle of the right pupil by which the deflection device deflects the image in the first direction to a maximum squint angle is $\alpha_2$; wherein a rotation angle of the actuation device is $\theta_{max}$, and $\theta_{max} > \alpha_2 - \alpha_1$; and wherein the rotation angle is configured to be an angle range in which the actuation device makes the display module rotate with a central axis of the display module as a rotation axis.

23. The display apparatus of claim 22, wherein the rotation angle comprises a horizontal rotation angle and a vertical rotation angle, and the horizontal rotation angle is greater than the vertical rotation angle.

24. The display apparatus of claim 22, wherein the display module comprises a first light emission wavelength, a second light emission wavelength, and a third light emitting wavelength, the second light emission wavelength is greater than the first light emission wavelength, and the third light emitting wavelength is greater than the second light emission wavelength; a maximum deflection angle of the first light emission wavelength caused by the deflection device is $\alpha_3$, and $\theta_{max} > \alpha_2 - \alpha_3$.

25. A method for controlling a display apparatus, being used for controlling a display apparatus, wherein the display apparatus comprises a display module and an adjustment module; the display module comprises a deflection device configured to make an image move at least in a first direction, and the deflection device comprises a liquid crystal grating (LCG); and the adjustment module comprises an actuation device, and the actuation device is configured to move or rotate the display module to make the image move at least in a second direction;

wherein the method comprises:

controlling the deflection device to make the image move at least in the first direction; and controlling the actuation device to make the image move at least in the second direction by moving or rotating the display module;

wherein the first direction is same as or different from the second direction; the first direction and the second direction each are parallel to the first plane, and the first plane is parallel to the plane where the deflection device is disposed.

26. The method of claim 25, wherein the first direction is different from the second direction, and the display apparatus comprises a second direction offset threshold;

before controlling the deflection device to make the image move in the first direction, the method further comprises:

acquiring a movement distance of a human eye in the first direction on the first plane and a movement distance of the human eye in the second direction on the first plane;

in a first state, in a case where the movement distance of the human eye in the second direction is less than or equal to the second direction offset threshold, controlling the deflection device to start and controlling the actuation device to close; and in a second state, in a case where the movement distance of the human eye in the second direction is greater than the second direction offset threshold, controlling the deflection device to start and controlling the actuation device to start.

27. The method of claim 25, wherein the first direction is the same as the second direction, the display apparatus comprises a first actuation mode and a first direction offset threshold, and the first actuation mode comprises a third state and a fourth state;

wherein before controlling the deflection device to make the image move in the first direction, the method further comprises:

determining that an actuation mode of the display apparatus is the first actuation mode;

acquiring a movement distance of a human eye in the first direction on the first plane; and comparing the movement distance with the first direction offset threshold; and wherein controlling the actuation device to make the image move at least in the second direction by moving or rotating the display module comprises:

in the third state, in a case where the movement distance of the human eye in the first direction is less than or equal to the first direction offset threshold, controlling the deflection device to start and controlling the actuation device to close; and in the fourth state, in a case where the movement distance of the human eye in the first direction is greater than the first direction offset threshold, controlling the deflection device to start and controlling the actuation device to start.

28. The method of claim 25, wherein before controlling the deflection device to make the image move in the first direction, the method further comprises:

determining a display mode of the display apparatus; and determining, according to the display mode, an offset threshold corresponding to the display mode.

29. The method of claim 25, wherein before controlling the deflection device to make the image move in the first direction, the method further comprises:

determining a movement area of a human eye in a movement direction on the first plane; and determining, according to the movement area, an offset threshold corresponding to the movement area.

30. The method of claim 25, wherein before controlling the deflection device to make the image move in the first direction, the method further comprises:

determining a to-be-monitored user corresponding to the display apparatus; and acquiring a maximum movement distance of a human eye of the to-be-monitored user in the first direction on the first plane; and wherein controlling the deflection device to make the image move in the first direction comprises:

controlling, according to a comparison result between the maximum movement distance and an offset threshold, the deflection device to make the image move in the first direction.

31. The method of claim 25, wherein the first direction is the same as the second direction, and the display apparatus comprises a second actuation mode and a unit deflection threshold;

wherein before controlling the deflection device to make the image move in the first direction, the method further comprises:

determining that an actuation mode of the display apparatus is the second actuation mode;

acquiring a movement distance of a human eye in the first direction on the first plane; and calculating a ratio of the movement distance to the unit deflection threshold; and wherein controlling the actuation device to make the image move at least in the second direction by moving or rotating the display module comprises:

in a fifth state, in a case where the ratio of the movement distance of the human eye in the first direction to the unit deflection threshold is less than or equal to 1, controlling the deflection device to start and controlling the actuation device to close; and in a sixth state, in a case where the ratio of the movement distance of the human eye in the first direction to the unit deflection threshold is greater than 1, controlling the deflection device to start and controlling the actuation device to start.

32. The method of claim 31, wherein in the sixth state, in the case where the ratio of the movement distance of the human eye in the first direction to the unit deflection threshold is greater than 1, controlling the deflection device to start and controlling the actuation device to start comprise:

in the sixth state, calculating and obtaining an integer N of a ratio of a movement distance of the human eye in the first direction to the unit deflection threshold, wherein $N \geq 2$, and N is a positive integer; and controlling the deflection device to deflect the image, and simultaneously controlling the actuation device to drive the display module to rotate in a movement direction of the human eye by N first unit rotation amplitudes so that the image is incident into the human eye.

33. A holographic three-dimensional (3D) display screen, comprising a display apparatus;

wherein the display apparatus comprises a display module and an adjustment module; the display module comprises a deflection device configured to make an image move at least in a first direction, and the deflection device comprises a liquid crystal grating (LCG); and the adjustment module comprises an actuation device, and the actuation device is configured to move or rotate the display module to make the image move at least in a second direction;

wherein the first direction is same as or different from the second direction; the first direction and the second direction each are parallel to a first plane, and the first plane is parallel to a plane where the deflection device is disposed.

* * * * *